(12) United States Patent
Leroy et al.

(10) Patent No.: US 12,546,875 B2
(45) Date of Patent: Feb. 10, 2026

(54) ONBOARDING A SENSING SYSTEM

(71) Applicant: Nami Ai Pte Ltd., Singapore (SG)

(72) Inventors: Jérôme Leroy, Singapore (SG); Grégoire Ménager, Singapore (SG)

(73) Assignee: Nami Ai Pte Ltd., Singapore (SG)

(*) Notice: Subject to any disclaimer, the term of this patent is extended or adjusted under 35 U.S.C. 154(b) by 693 days.

(21) Appl. No.: 17/940,291

(22) Filed: Sep. 8, 2022

(65) Prior Publication Data
US 2023/0072377 A1   Mar. 9, 2023

(30) Foreign Application Priority Data
Sep. 8, 2021 (SG) .............. 10202109879U

(51) Int. Cl.
| | | |
|---|---|---|
| *G01S 13/00* | (2006.01) | |
| *G01S 7/00* | (2006.01) | |
| *G01S 13/56* | (2006.01) | |
| *G01S 13/86* | (2006.01) | |

(52) U.S. Cl.
CPC ............ *G01S 13/003* (2013.01); *G01S 7/006* (2013.01); *G01S 13/56* (2013.01); *G01S 13/865* (2013.01)

(58) Field of Classification Search
CPC ...... G01S 13/865; G01S 7/006; G01S 13/003; H04W 84/12; H04W 24/08; H04W 24/02; H04B 17/309
See application file for complete search history.

(56) References Cited

U.S. PATENT DOCUMENTS

| | | | | |
|---|---|---|---|---|
| 9,964,468 B1* | 5/2018 | Wu | ............... | G01M 5/00 |
| 10,112,300 B2* | 10/2018 | Baroudi | ............... | B25J 9/1664 |
| 10,432,375 B1* | 10/2019 | Kang | ............... | H04W 72/52 |
| 10,798,529 B1* | 10/2020 | Beg | ............... | H04W 24/10 |
| 11,740,346 B2* | 8/2023 | Kravets | ............... | G01S 13/56 |
| | | | | 342/28 |

(Continued)

FOREIGN PATENT DOCUMENTS

| | | |
|---|---|---|
| EP | 3492944 A1 | 6/2019 |
| WO | 2017178779 A1 | 10/2017 |

OTHER PUBLICATIONS

Extended European Search Report from European Patent Application No. 22194704.7, dated Feb. 1, 2023.

*Primary Examiner* — Peter M Bythrow
(74) *Attorney, Agent, or Firm* — Dergosits & Noah LLP; Todd A. Noah

(57) ABSTRACT

A computer-implemented method of configuring a sensing system for monitoring a place, the sensing system comprising a plurality of network devices located in the place and including at least one network device configured as a transmitter to transmit wireless signals over a wireless channel and at least one network device configured as a receiver to receive wireless signals transmitted in the place and subject to disturbance by the place. Wireless signals are transmitted from the transmitter. Disturbed wireless signals are detected at the receiver. A characteristic of a first physical configuration of the network devices is determined from the disturbed wireless signals, and feedback based on the characteristic is provided to a user, via a user interface of a client device associated with the user. It is detected that a second physical configuration has been implemented in response to the feedback, and a characteristic of a second physical configuration is determined.

16 Claims, 27 Drawing Sheets

(56) References Cited

U.S. PATENT DOCUMENTS

| | | | | |
|---|---|---|---|---|
| 12,185,123 | B2* | 12/2024 | Pefkianakis | H04W 16/28 |
| 12,250,050 | B2* | 3/2025 | Pefkianakis | H04B 7/0695 |
| 2017/0154140 | A1* | 6/2017 | Wilson | G06F 30/20 |
| 2017/0246742 | A1* | 8/2017 | Baroudi | B25J 9/1664 |
| 2018/0321687 | A1* | 11/2018 | Chambers | G06Q 30/0261 |
| 2018/0359609 | A1* | 12/2018 | Bonanno | H04W 4/029 |
| 2018/0365975 | A1* | 12/2018 | Xu | G08B 29/185 |
| 2019/0158340 | A1* | 5/2019 | Zhang | H04B 17/318 |
| 2020/0150263 | A1* | 5/2020 | Eitan | G01S 13/003 |
| 2020/0166609 | A1* | 5/2020 | Trotta | G01S 7/412 |
| 2021/0185485 | A1* | 6/2021 | Deixler | H04W 64/003 |
| 2021/0372862 | A1* | 12/2021 | Cheng | G01K 1/026 |
| 2022/0022056 | A1* | 1/2022 | Park | H04W 28/18 |
| 2022/0268878 | A1* | 8/2022 | Gulati | G01S 13/931 |
| 2022/0327360 | A1* | 10/2022 | Merlin | H04B 17/318 |
| 2022/0329330 | A1* | 10/2022 | Merlin | H04W 16/20 |

\* cited by examiner

RSSI -55

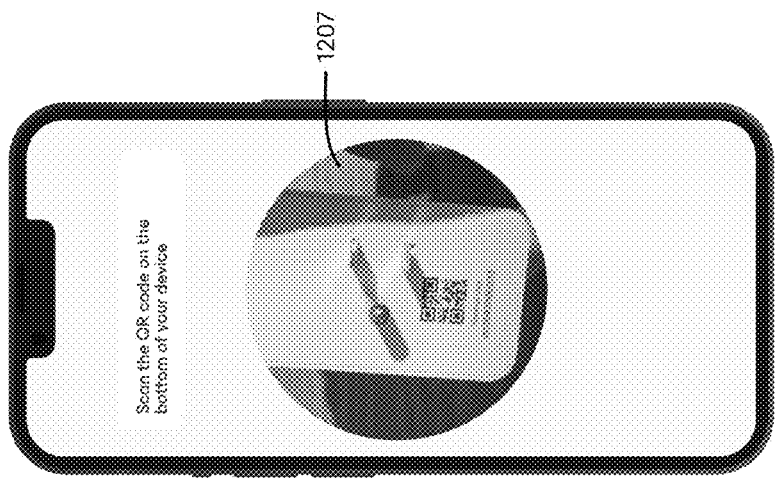
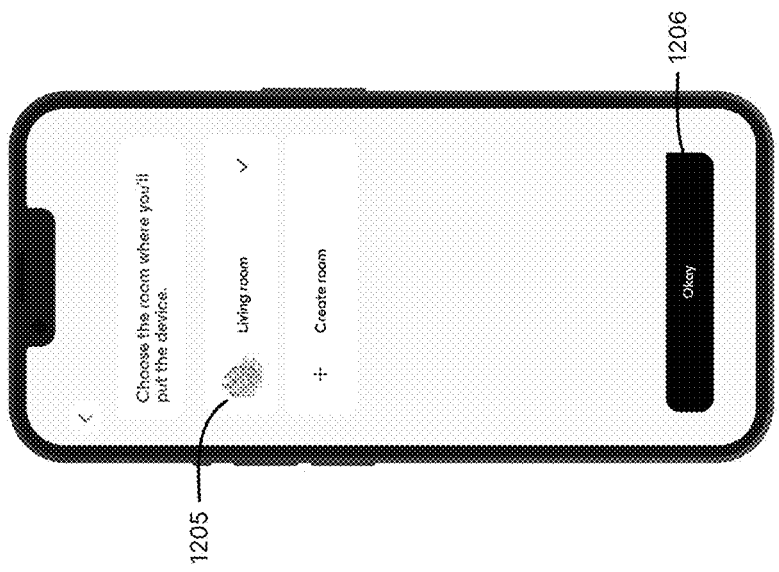
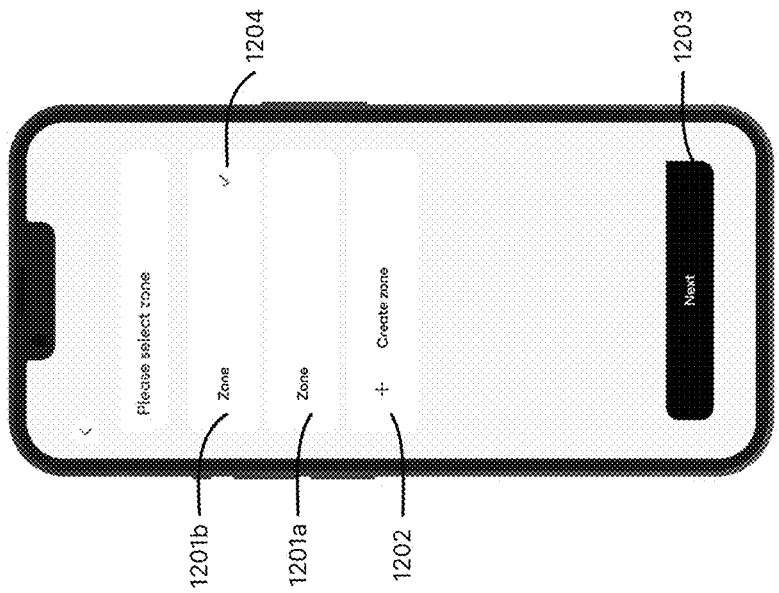
*Figure 12C*  *Figure 12B*  *Figure 12A*

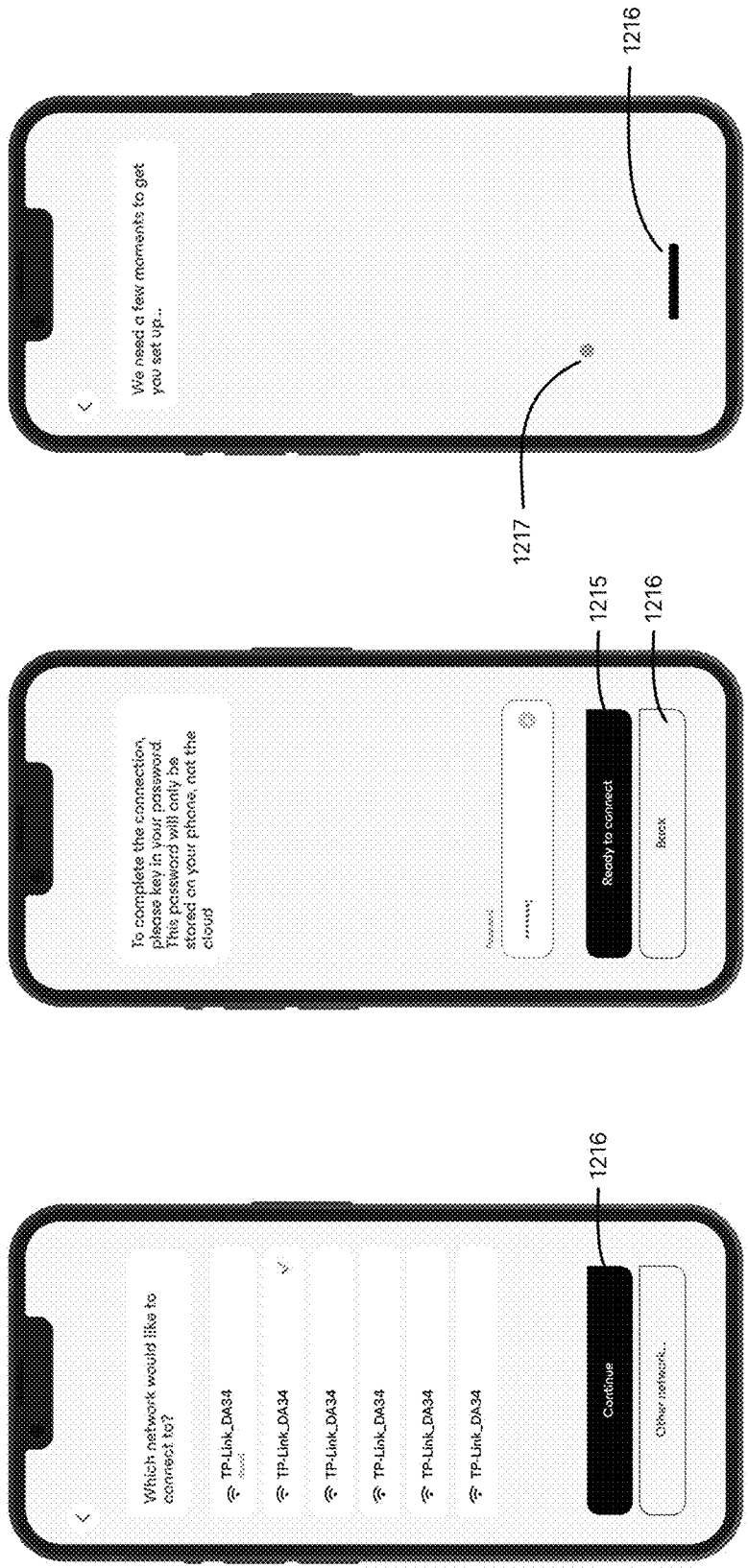

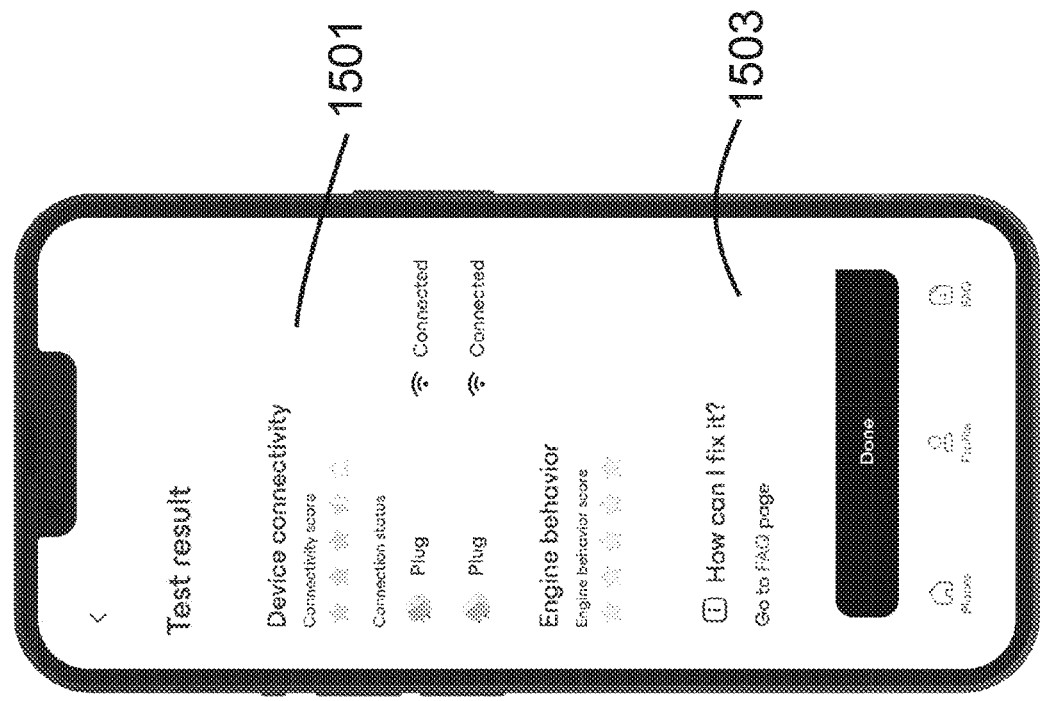
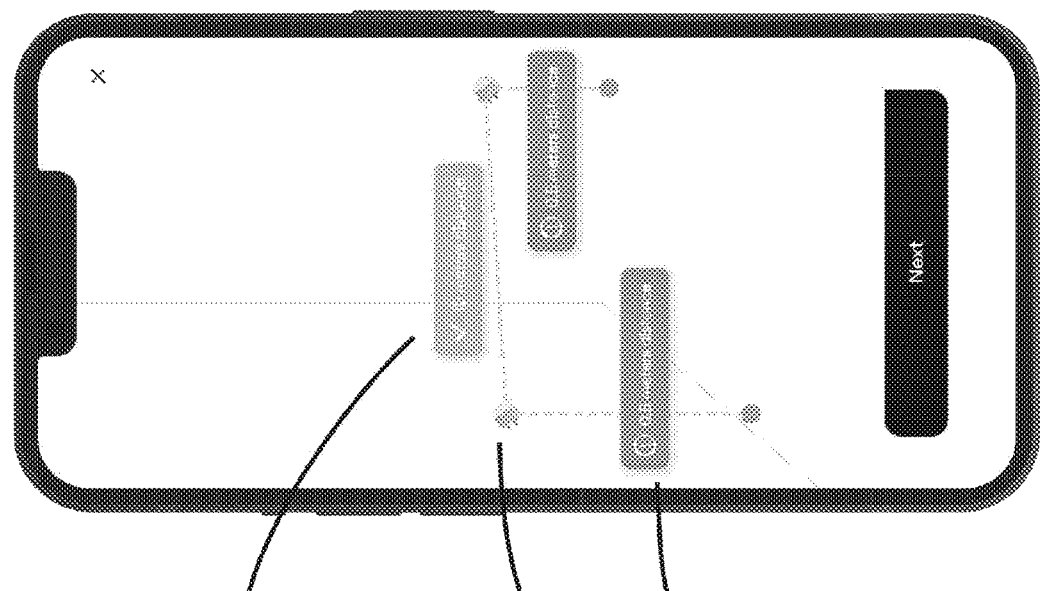
Figure 15A
Figure 15B

ONBOARDING A SENSING SYSTEM

TECHNICAL FIELD

The present disclosure relates to a sensing system, and a method and system for configuring a sensing system, particularly, but not exclusively, for onboarding the system.

BACKGROUND

Wi-Fi, one of the most commonly used wireless network protocols, is typically associated with wireless internet access and local area networking of devices. The growth in number of Wi-Fi enabled networks around the world to comprise of tens of billions of connected devices has opened up a new range of possibilities for application of Wi-Fi technology other than providing wireless internet access and communication. One promising and tangible application of Wi-Fi signals is that of using it for motion sensing.

Wi-Fi sensing has been developed over recent years as an alternative way to monitor places. It has various advantages over other sensing solutions. In some forms, it does not need any extra hardware but can rely on existing Wi-Fi routers and Wi-Fi enabled devices in a place. For example, active radar systems require dedicated antennas and transceivers that are complex and costly, while Wi-Fi sensing uses existing devices like cell phones, PCs, and mesh Wi-Fi systems.

Wireless signals, for example Wi-Fi signals, can be used to sense an entity by monitoring changes in signal characteristics. The use of wireless signals in presence detection has the advantage that no cameras need to be used, and therefore the privacy of those being sensed is maintained.

Wi-Fi signals penetrate through walls, enabling out of line-of-sight (LOS) operation, an important consideration for security monitoring applications.

Wi-Fi sensing is innately cost-effective due to the near-ubiquitous nature of Wi-Fi. Wi-Fi is widespread, so the infrastructure is already in place. There is no need to build a new ecosystem because the IoT (Internet of Things) provides the perfect ecosystem for a sensing system.

Wi-Fi sensing has been found to be surprisingly accurate. Channel State Information (CSI) is collected from the packets and signals used for transmitting and receiving information from regular devices connected via a Wi-Fi network. This technology does not require any additional specialized signals, nor does it degrade network performance or the user experience when using Wi-Fi.

In some Wi-Fi sensing systems, Wi-Fi devices which are already installed in the place are used. Therefore, there is no physical setup process required. The devices are configured to sense their environment from their current locations.

In other Wi-Fi sensing systems, hardware is provided for the purpose of Wi-Fi sensing. In such systems, an installer of the system is provided with diagrams or photographs indicating preferred and/or less preferred locations for the hardware in the place. The installer may also be provided with other preferred location information, such as a preferred distance between devices, a preferred relative direction of the device, etc. It is up to the installer to attempt to find the best places for the sensing devices, so effective systems need expert installation.

SUMMARY

The present inventor has recognised a need to be able to install effective wireless systems (such as Wi-Fi systems) without needing experts. Furthermore, they have recognised that, even with expert installers, the Wi-Fi devices are often not installed at the locations best suited for Wi-Fi sensing, and therefore the sensing system cannot perform at its full potential. Areas of the place may not be within a sensing zone of the system at all. The devices may be positioned such that there is an unacceptable number of false positives (alerts or notifications which are not warranted) or a decrease in the sensitivity of the system such that the presence of entities is missed.

The present inventors have further recognised a need to be able to install effective RF sensing systems in a variety of contexts. In certain embodiments described herein, fully setting up such a system comprises three main parts. It starts with setting up the devices in the location the sensing system has to cover. After the system has been up for a few days, a second step of tweaking and optimizing the sensing system can take place. The setup ends with providing access to the system and its insights to the end-users, describing the different roles of users and alert links between them. Those three steps may have to be adapted for different situations, depending on the kind of place the RF sensing must cover, and the possible involvement of third parties.

Certain embodiments relate to onboarding a non line of sight wireless/RF system. The term "onboarding" may be understood to include: commissioning/set up and including end-users' profiles in logic underlying the system.

According to a first aspect of the present invention, there is provided a computer implemented method of configuring a sensing system for monitoring a place. The system comprises a plurality of network devices located in the place and includes at least one network device configured as a transmitter to transmit wireless signals over one or more wireless channel and at least one network device configured as a receiver to receive wireless signals transmitted in the place and subject to disturbance by the place. The method comprises: transmitting wireless signals from the transmitter; detecting disturbed wireless signals at the receiver; determining from the disturbed wireless signals a characteristic of a first physical configuration of the network devices; providing to a user, via a user interface of a client device associated with the user, feedback based on the characteristic of the first physical configuration; detecting that a second physical configuration has been implemented in response to the feedback; and determining a characteristic of a second physical configuration.

By determining a characteristic of the physical configuration, the administrator can be provided with feedback for improving the physical configuration so that the Wi-Fi devices are located in better positions for the sensing system thus resulting in a sensing system in which the devices are better positioned for sensing the place. Not only does the system and method of the present disclosure enable unskilled users to install an effective Wi-Fi sensing system, but it also improves the robustness of the Wi-Fi sensing system.

In some embodiments, the wireless signals may be Wi-Fi signals or any other kinds of radiofrequency (RF) signals such as 5G waves. Other wireless technologies may be utilised.

In some embodiments, the location covered by the system can be a home.

In some embodiments, the location covered by the system can be a building such as multi-dwelling units, units for a hospitality market (e.g., hotel, or service apartment), commercial building such as an office, a store, a mall, or a warehouse.

In some embodiments, the installer can be an end-user of the sensing system and will use the sensing system.

In some embodiments, the installer can be a third party and will not directly use the sensing system.

The installer might proceed to perform a retrofit installation in an existing occupied home or building or to a new build installation in an empty home or building.

In some embodiments, the users can have different roles in the sensing system and different access credentials to its settings.

In some embodiments, the sensing system can be integrated into a larger system from a third party such as building management system or centralized services management system, or a generic IoT (Internet of Things) devices control application (App).

In some embodiments, the end-users can use tools of the sensing system to optimize its performance.

In some embodiments, third-party professionals can use tools of the sensing system to optimize its performance.

In some embodiments, the method may further comprise determining if the characteristic of the first physical configuration meets a configuration criterion, wherein the feedback is provided based on whether the characteristic of the first physical configuration meets the criterion.

In some embodiments, the method may further comprise determining a reconfiguration instruction for changing from the first physical configuration to the second physical configuration, the reconfiguration instruction being based on a physical change required for meeting the configuration criterion.

In some embodiments, the feedback may be the reconfiguration instruction.

In some embodiments, the method may further comprise providing to the user, via a user interface, feedback based on the characteristic of the second physical configuration.

In some embodiments, the characteristic of the first physical configuration may be a signal characteristic of a first received signal and the characteristic of the second physical configuration is a signal characteristic of a second received signal, wherein the first and second received signals are received the receiver.

In some embodiments, the feedback may comprise an indication of the signal characteristic of the first received signal.

In some embodiments, the method may further comprise determining a second characteristic of the first received signal, wherein the feedback is based on the second characteristic.

In some embodiments, the signal characteristic may be at least one of RSSI, a signal-to-noise ratio, and a Wi-Fi round-trip-time.

In some embodiments, the signal characteristic may be channel state information.

In some embodiments, the method may further comprise determining if the characteristic of the first physical configuration meets a configuration criterion, wherein the feedback is provided based on whether the characteristic of the first physical configuration meets the criterion, wherein the configuration criterion defines that the channel state information of the received signal matches channel state information of a characteristic signal representative of the place.

In some embodiments, the feedback provided may comprise a request for the user to confirm movement of an entity in a path of the first received signal and, upon receiving a confirmation of the movement from the user via the user interface, at least one of an indication of a quality of the first signal and a reconfiguration instruction.

In some embodiments, the method may further comprise determining if the characteristic of the first physical configuration meets a configuration criterion, wherein the feedback is provided based on whether the characteristic of the first physical configuration meets the criterion, wherein configuration criterion comprises the signal characteristic of the first received signal being substantially similar to the signal characteristic of a past signal received at the receiver.

In some embodiments, the method may further comprise determining a second characteristic of the first and second physical configurations based on data collected by the client device.

In some embodiments, the data collected by the client device may comprise at least one of location and movement data corresponding to a location of the transmitter and the receiver, wherein the method may further comprise determining a distance between the transmitter and the receiver based on the collected data.

In some embodiments, the collected data may comprise LiDAR data, wherein the method may further comprise determining a distance between the transmitter and the receiver based on the LiDAR data.

In some embodiments, the first physical configuration may comprise the transmitter and the receiver in a first relative position, and the second physical configuration may comprise the transmitter and the receiver in a second relative position.

In some embodiments, the first physical configuration may comprise a first transmitter receiver pair comprising the transmitter and the receiver, and the second physical configuration may comprise a second transmitter-receiver pair, wherein one of the transmitter and the receiver is the same in the first and second pairs and the other of the transmitter and the receiver is different in the first and second pairs.

In some embodiments, the first physical configuration may comprise the transmitter and receiver communicating over a first network channel, and the second physical configuration may comprise the transmitter and receiver communicating over a second network channel.

According to a second aspect of the present invention, there is provided a computing device for configuring a sensing system for monitoring a place, the system comprising a plurality of network devices located in the place and including at least one network device configured as a transmitter to transmit wireless signals over one or more wireless channels and at least one network device configured as a receiver to receive wireless signals transmitted in the place and subject to disturbance by the place. The computing device comprises: at least one processor; and memory storing instructions, which, when implemented on the at least one processor, cause the at least one processor to: determine a characteristic of a first physical configuration of the network devices from disturbed wireless signals received at the receiver; provide to a user, via a user interface of a client device associated with the user, feedback based on the characteristic of the first physical configuration; detect that a second physical configuration has been implemented in response to the feedback and determine a characteristic of a second physical configuration.

According to a third aspect of the present invention, there is provided a computer program which is stored on a non-transitory computer-readable storage medium and which is configured, when executed on one or more processors, to: determine a characteristic of a first physical configuration of the network devices from disturbed wireless signals received at the receiver; provide to a user, via a user interface of a client device associated with the user, feedback based on the characteristic of the first physical configuration; detect that a second physical configuration has been implemented in response to the feedback and determine a characteristic of a second physical configuration.

According to a fourth aspect of the present invention, there is provided a sensing system for monitoring a place. The system comprises: a plurality of mesh devices located in the place, including at least one mesh device configured as a receiver and at least one mesh device configured as a transmitter; a computing device for configuring a sensing system for monitoring a place, the system comprising a plurality of network devices located in the place and includes at least one network device configured as a transmitter to transmit wireless signals over one or more wireless channels and at least one network device configured as a receiver to receive wireless signals transmitted in the place and subject to disturbance by the place, the computing device comprising: at least one processor; memory storing instructions, which, when implemented on the at least one processor, cause the at least one processor to: determine a characteristic of a first physical configuration of the network devices from disturbed wireless signals received at the receiver; provide to a user, via a user interface of a client device associated with the user, feedback based on the characteristic of the first physical configuration; detect that a second physical configuration has been implemented in response to the feedback; and determine a characteristic of a second physical configuration.

The method may comprise determining a localisation context for the sensing system, the localisation context optionally selected from a group comprising professional buildings and domestic buildings.

The method may comprise determining an installation context for the sensing system, the installation context optionally selected from an end user of the system and a third party installer.

The method may comprise determining the role of one or more user of the system, wherein a user is optionally an invited user by an administrator, and wherein the role is optionally selected from a group comprising an administrator, a steward and a family member.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 12A-12M shows an example user interface for configuring the sensing system.

FIGS. 15A-15B show another example of the user interface shown in FIGS. 8A, 8B.

DETAILED DESCRIPTION

Wireless communication systems may be used for motion detection. A wireless communication network uses a set of wireless communication channels which are provided between devices of the wireless communication network. Signals may be transmitted over the wireless communication channels from a transmitter device to a receiver device to enable changes in an environment to be sensed. Various technologies can be utilised for the wireless communication channels and the signals which are transmitted and received. For example, signals used in telecommunication environments such as WCDMA (wide band code division multiple access), LTE (long term evolution) and telecommunication signals according to the third generation, fourth generation and fifth generation protocols (3G, 4G and 5G). Other technologies may be utilised, such as Bluetooth and Wi-Fi. The wireless communication network described herein is described utilising Wi-Fi sensing as the implementation technology of the wireless communication network. However, it will be appreciated that other wireless communications protocols (for example those described above or involving RF technologies) may be utilised.

Wi-Fi sensing is a technology that uses Wi-Fi signals to operate like a short-range passive radar by measuring how the signals interact with movement and the environment. By transmitting signals into the environment, Wi-Fi sensing systems can track motion and presence based on how the signals are reflected and deflected.

Wi-Fi sensing performance is correlated to channel bandwidth. The larger the bandwidth, the higher the resolution. Currently, Wi-Fi works in 2.4 GHz, 5 GHz, 6 GHz, and GHz bands. Channel bandwidth in the 2.4 GHz spectrum is 20 MHz or 40 MHz, 5 GHz is 160 MHz, and 6 GHz band can be up to 1200 MHz (Wi-Fi 6E). The wavelengths of the Wi-Fi signal in these bands spans from 4.2 cm (6 GHz band) to 12.4 cm (2.4 GHz band).

Such signals are well-suited for motion detection, activity detection, and recognition of human bodies as well as the breathing rate and even heartbeat detection through DSP (digital signal processing), machine learning algorithms and other processing techniques. Wi-Fi sensing technology enables security, safety, and family care services in smart home and internet of things (IoT) applications. It supports a variety of features and applications such as motion detection, human activity detection and recognition and vital signs detection.

One problem with Wi-Fi sensing systems is that the positioning of the Wi-Fi devices results in a sensing system which is not capable of performing as well as it could do.

Figure 1:
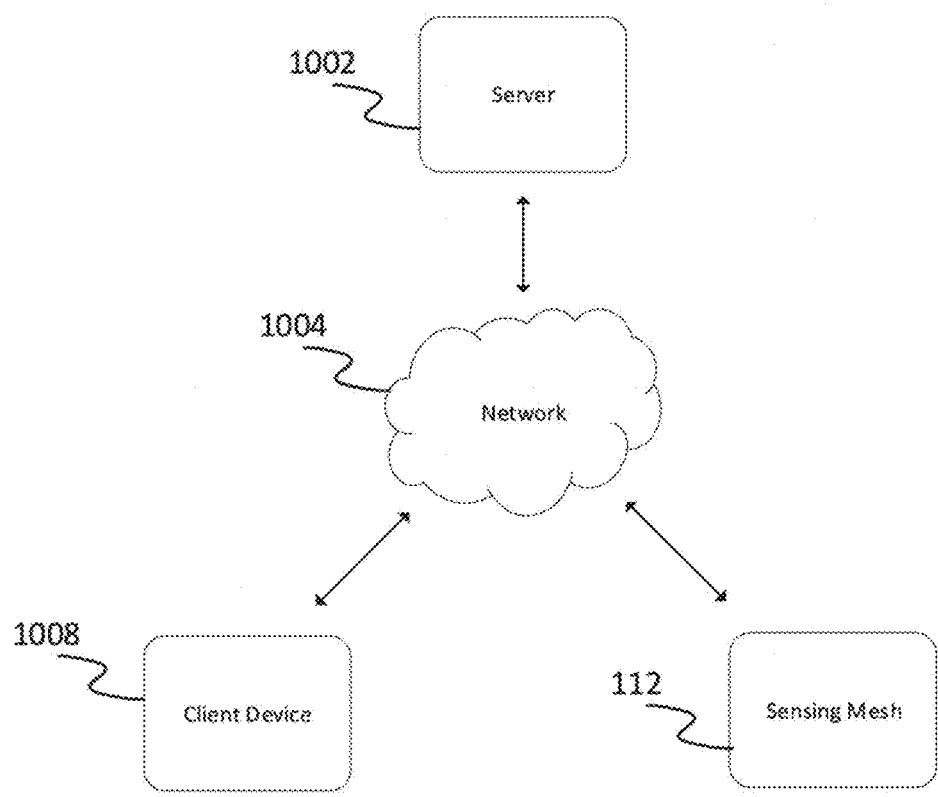
FIG. 1 is a schematic diagram of a computing system in which embodiments of the sensing system may be implemented.

FIG. 1 shows an example computing environment for the sensing system described herein. A server 1002 communicates with a client device 1008 and Wi-Fi devices which are to form a sensing mesh 112 via a network 1004, such as the Internet. The server 1002 may be a cloud computing environment 110 (see FIG. 2), or another server remote from the mesh devices. The client device 1008 may be a personal computing device such as a laptop or smart phone.

Figure 2:
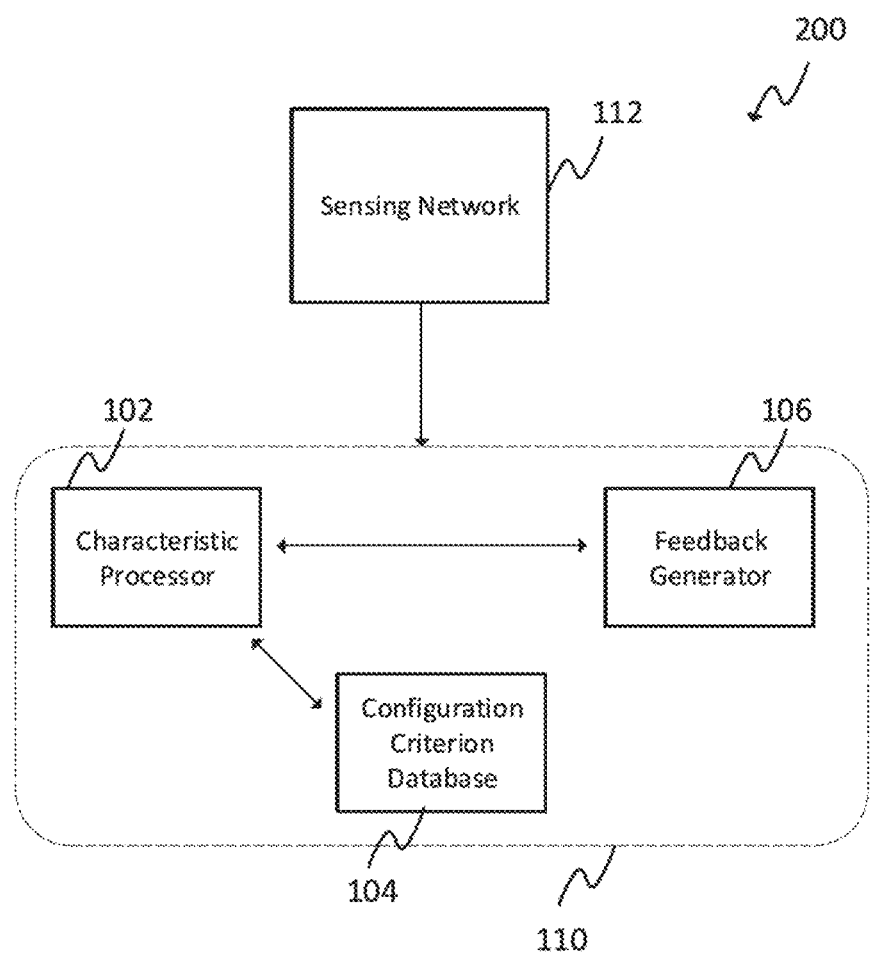
FIG. 2 is a schematic diagram of a presence detection system.

FIG. 2 shows an example sensing system 200.

The system comprises the sensing network 112. The sensing network 112 is made up of a set of network devices (or mesh devices), or nodes, which communicate with one another. Each node acts as at least one of a transmitter and a receiver device.

The system also comprises a characteristic processor 102, a feedback generator 106, and a configuration criterion database 104. These components are implemented on the cloud computing environment 110. The cloud computing environment 110 comprises one or more remote servers which communicate with the mesh devices of the mesh network 112 via a network. The cloud computing environment 110 may also communicate, via the network, with the user device 1008 in order to provide information to a user of the device relating to the sensed data.

In some embodiments, the characteristic processor 102, feedback generator 106, and configuration criterion database 104 are instead implemented at the user device 1008 or a processing device in the mesh network.

The mesh devices transmit and/or receive Wi-Fi signals. Characteristic data relating to the received signals are sent to the cloud computing environment 110. The characteristic data is determined by a processor of the receiver device receiving the signal.

Once received at the cloud computing environment 110, the characteristic data is passed to the characteristics processor 102 which determines, using the configuration criterion database 104 whether the devices relating to the received characteristic data are in a suitable location and, if not, how their relative locations can be altered to improve the system with the goal of meeting a characteristic criterion. The characteristic processor 102 passes an indication of whether the criterion is met and/or the improvement to the feedback generator 106, which provides the information to a user of the system 200 via a user interface displayed on the client device 1008.

Instead of the signals received at the cloud computing environment 110 being from the mesh/network devices, the signals may be received from the client device 1008. For example, the client device 1008 may be used to determine locations of the mesh devices. This information is passed to the characteristic processor 102, which uses the collected information in the same manner as set out above.

The configuration criterion database 104 may store configuration criterion for the nodes of the sensing network 112.

For example, if the characteristic data is a received signal strength indication (RSSI), the criterion may be that the RSSI value must be within the range of −70 to −75. It will be appreciated that the criteria disclosed herein are provided by way of example only. The criterion used may be dependent on, for example, the room in which the devices in communication are located. An RSSI of about −50 might be preferred if the devices are in the same room, for example.

The configuration criterion database 104 may also store a possible solution for meeting the criterion. Following on from the example set out above, the possible solution stored at the database 104 may be: if the RSSI is greater than −70, move devices apart; if the RSSI is less than −75, move devices closer together.

In another example, there are multiple RSSI configuration criteria. The criteria may define that an RSSI in the range of −50 to −60 is preferable, and a RSSI of −30 is not suitable. Under such criteria, the user may receive an indication that any device from which a signal with and RSSI of −30 or higher is received will not be used in the sensing mesh if the location is configuration is maintained. For any device with a signal RSSI of −30 to −50, the user may receive an improvement suggestion and also an indication that the device will be used in the sensing mesh if the location is configuration is maintained, however the mesh will not be optimal.

Other example characteristics and criteria will be discussed below.

Figure 3:
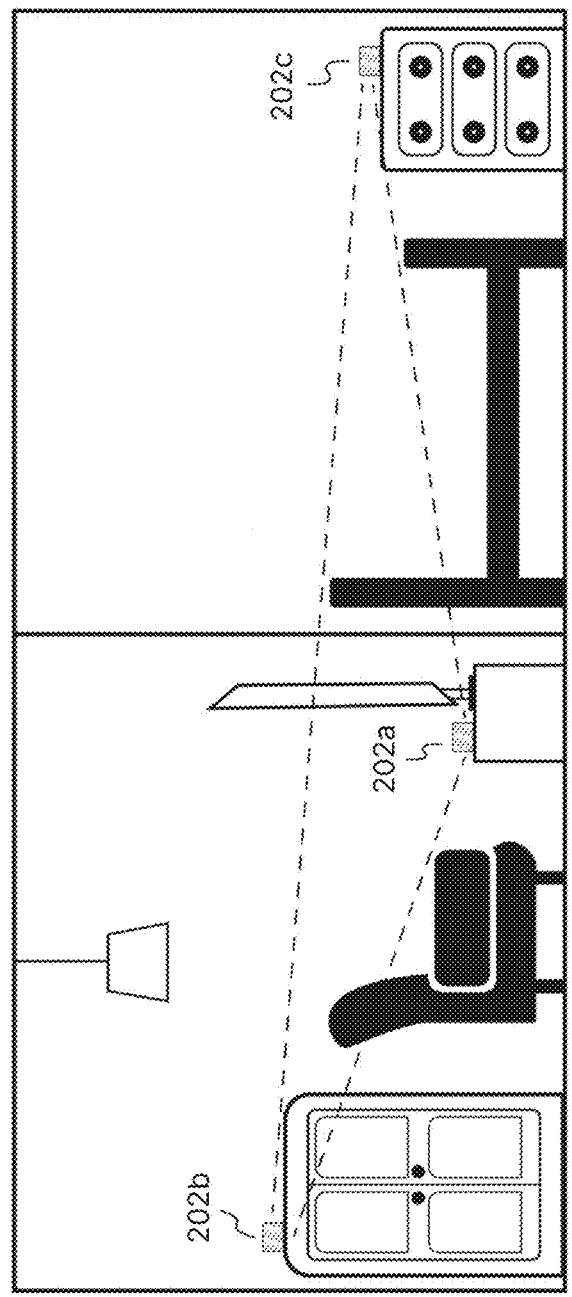
FIG. 3 is a schematic diagram of a mesh network within an indoor environment.

FIG. 3 shows a house with two rooms, each room housing at least one network device 202a-c The house of FIG. 3 is an example "place" of the present disclosure, where a place is a region being sensed by the sensing network. There are two network devices 202a, 202b in the living room, and one device 202c in the bedroom. For a more detailed context of the different kind of locations, installers types, and user access rights, see FIG. 13.

The network shown in FIG. 3 has a full network topology, where each device 202a-c is in direct communication with each of the other devices 202a-c. Additionally, each of the devices 202a-c acts as both a transmitter and a receiver, as shown by the bi-directional arrows.

That is, for example, the device 202c in the bedroom receives signals from the two devices 202a, 202b in the living room. It also transmits signals to each of the devices 202a, 202b. By placing network devices around the house, a mesh network can be configured which transmits signals between devices 202a-c such that the signals can be used to sense most, if not all, of the house. Although the signals in FIG. 3 are shown to be transmitted in a straight line between the transmitter and the receiver, at least part of each signal may be reflected off surfaces, including furniture and walls.

Figure 4A:
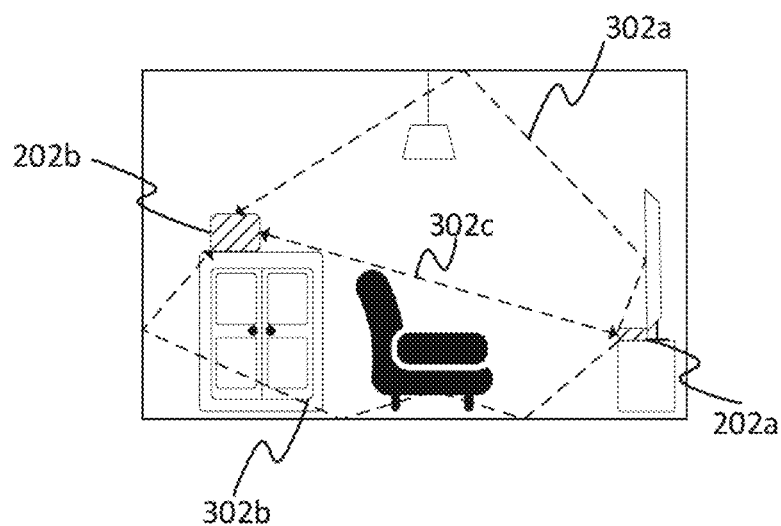
FIGS. 4A-4B schematically illustrate signal variations due to the presence or non-presence of entities in the room.
Figure 4A:
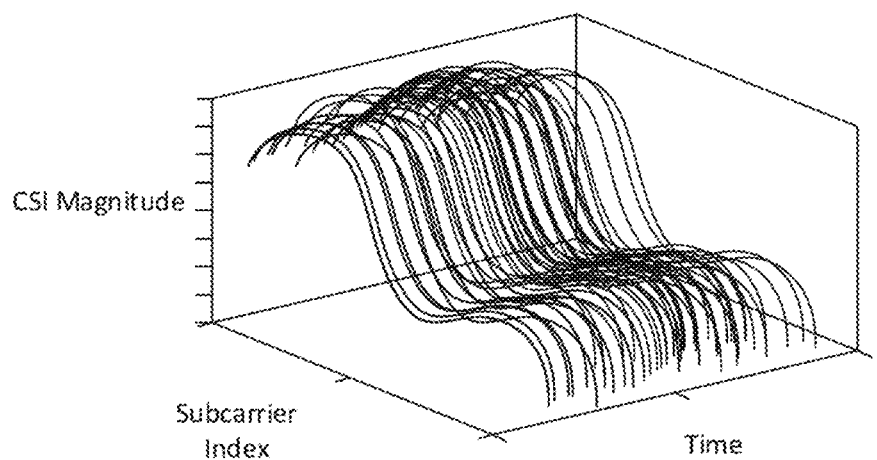

FIG. 4A shows the living room in an "undisturbed state", i.e., the room is empty, with nothing moving in the room. Three signal paths 302a-c are shown between the device 202a and the device 202b. The device 202a is here configured as a transmitter device, while the device 202b is configured as a receiver device.

The first signal, following path 302a, is transmitted upwards and slightly right of the device 202a, reflecting off the surface of the TV, and then reflecting off the ceiling, before being received at the receiver device 202b. The second signal, following path 302b, is transmitted downwards and to the left of the transmitter device 202a, reflecting off the floor, followed by the base of the sofa, then by the floor again, followed by the left-hand wall, before being received at the receiver device 202b. The third signal, following path 302c, travels in an uninterrupted straight line from the transmitter device 202a to the receiver device 202b.

When the room is empty, each of these signals is considered a characteristic signal and the signal data a characteristic data representation of the indoor environment. That is, the characteristics of each of the signals received at the receiver device 202b relate to the layout of the room.

FIG. 4A also shows a graph of channel state information (CSI) for the signal traversing path 302a which may be used to sense an entity in a room. The graph shows a CSI magnitude over subcarrier index over time It will be appreciated that the graph shown is provided for illustration purposes only.

The CSI is determined based on changes in amplitude, or phase, or both of the received signals. The CSI shown is that corresponding to the empty room and is therefore considered the characteristic data representative of the environment. This CSI is otherwise referred to herein as the CSI fingerprint. The signals shown in FIG. 4A are characteristic signals as they represent the environment in an undisturbed or reference state. The CSI fingerprints are stored for use in presence detection. The areas of the room, or house when communicating with devices 202a and 202b, which are sensed by the signals are referred to herein as signal zones.

Figure 4B:
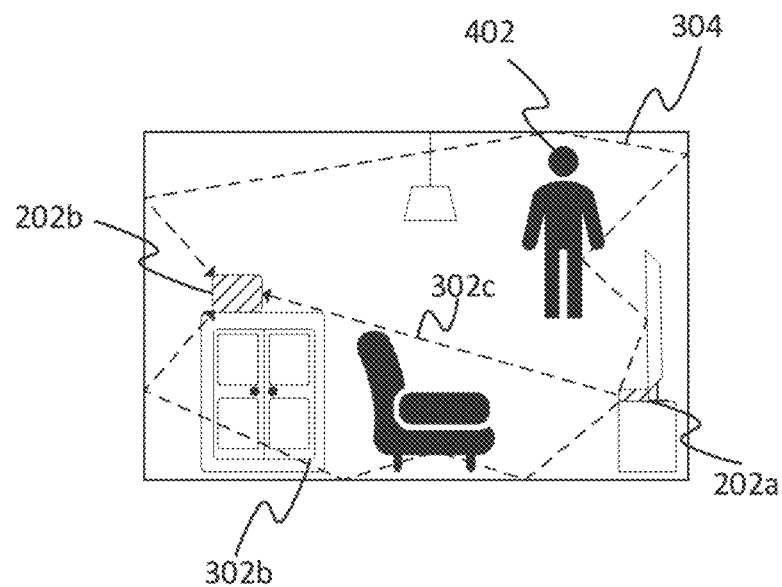
Figure 4B:
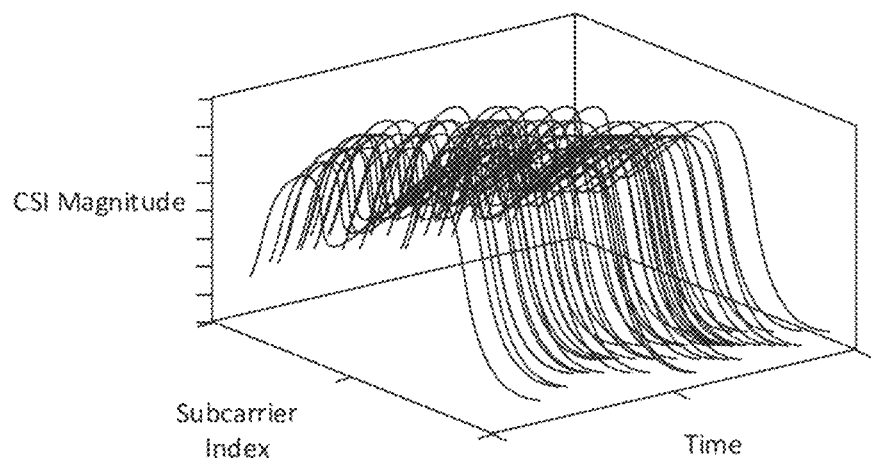

FIG. 4B shows the same room with devices 202a and 202b when a person 402 is in the room. It can be seen that the signals traveling along paths 302b and 302c are undisturbed because the person 402 is not in the signal zone of either of these signals. That is, the person 402 is not in the signal paths 302b, 302c.

The signal which, when the room is empty, travels along path 302a (FIG. 4A) has been disturbed. This signal now travels along path 304. This change in signal path results in a change in the characteristics of the signal, as shown by the graph in FIG. 4B.

As set out above, the devices 202a-c can be either transmitter devices, receiver devices, or may act as both transmitters and receivers.

By comparing the CSI of a received signal to the CSI fingerprint, presence of the person 402 can be determined. It will be appreciated that comparing received CSI to the fingerprint CSI can also be used to determine that one of the devices 202a, 202b has moved. In such a scenario, the path of the signal would change and therefore the CSI would be affected. This allows for monitoring of the system in the case of disturbance of a device, for example.

As described above, one criterion which may be used to determine if the devices 202a, 202b are in the preferred locations for sensing is the RSSI. RSSI is an indication of how well a device can hear signals from another device. Therefore, the closer the devices are together, the better the RSSI.

Figure 5A:
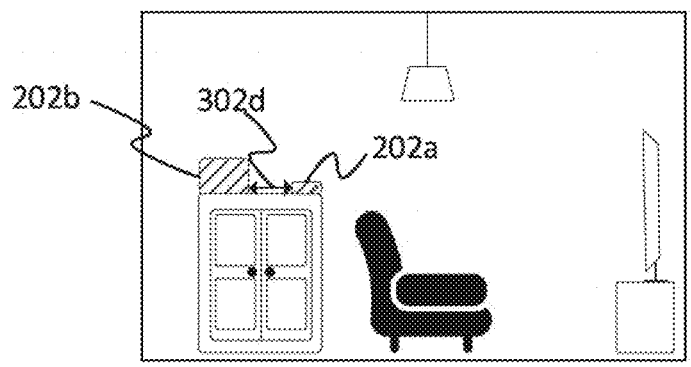
FIGS. 5A-5B schematically illustrate signal strength variations due to device location in a room.

FIG. 5A shows a room in which the devices 202a, 202b are positioned next to each other. The signal between them traverses the path 302d. In such a setup, the RSSI is high, for example −50, because the devices 202a, 202b are able to hear signals from each other well.

However, such a setup is not suitable for sensing the room. The path 302d does not pass through sufficient space in the room to enable an entity within the room to be sensed by the direct path between the mesh devices. While some signals will be reflected around the room from one device to the other, these signals would have low RSSI values and therefore would not be suitable for sensing either.

In this case, the characteristic processor 102 of FIG. 2 would determine that the devices 202a, 202b are too close together and that the improvements is to move the devices 202a, 202b apart.

Figure 5B:
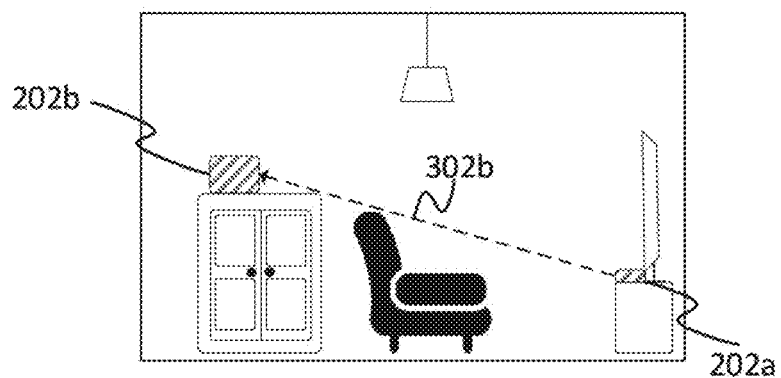

FIG. 5B shows the room after a user has implemented the improvement. The devices 202a, 202b are further apart, with one on each side of the room. The signal traverses the path 203b. The signals between the two devices 202a, 202b now sufficiently capture the room, while also having a signal strength strong enough to capture any changes in the environment. The signal traversing path 302b may have an RSSI of −70, for example.

Figure 6:
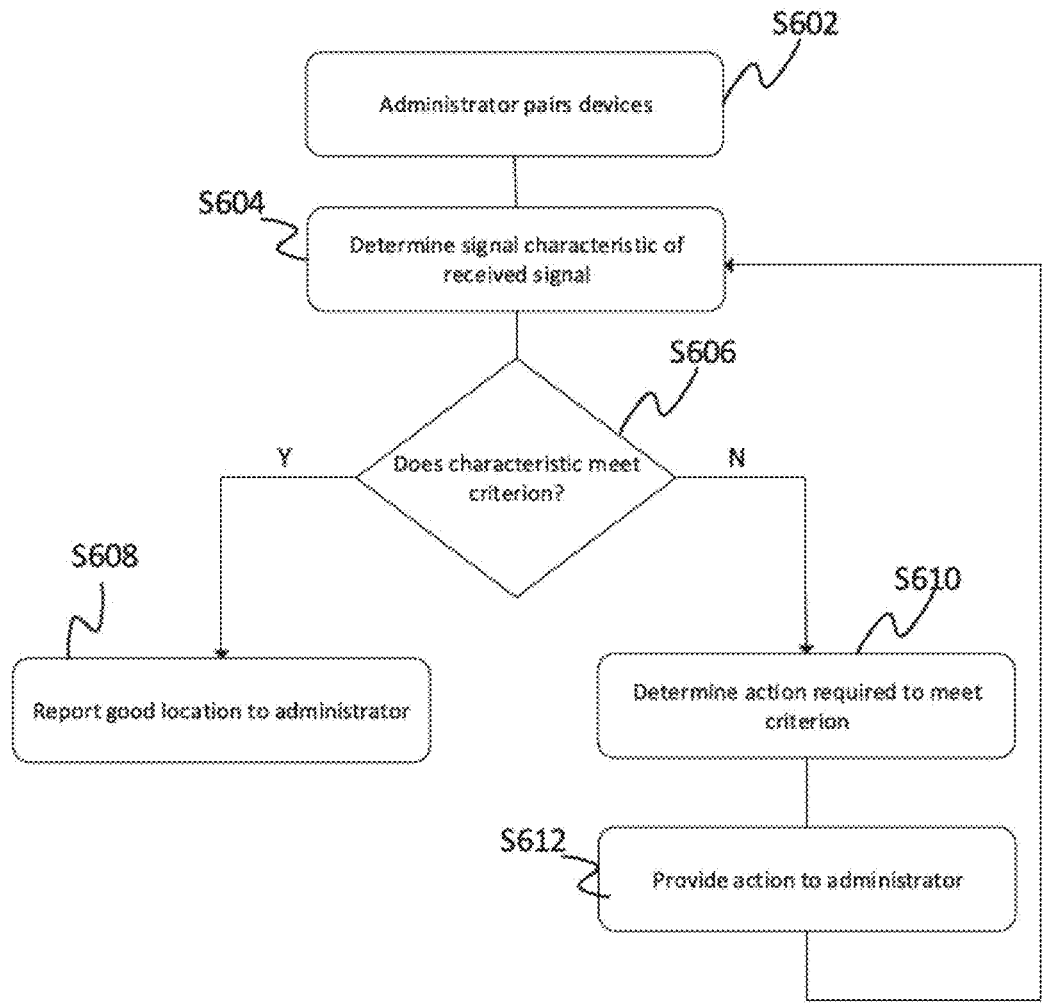
FIG. 6 is an example method for configuring the sensing system using signals transmitted between paired devices.

FIG. 6 shows an example method for configuring the sensing system which uses signals received at the devices.

Figure 20:
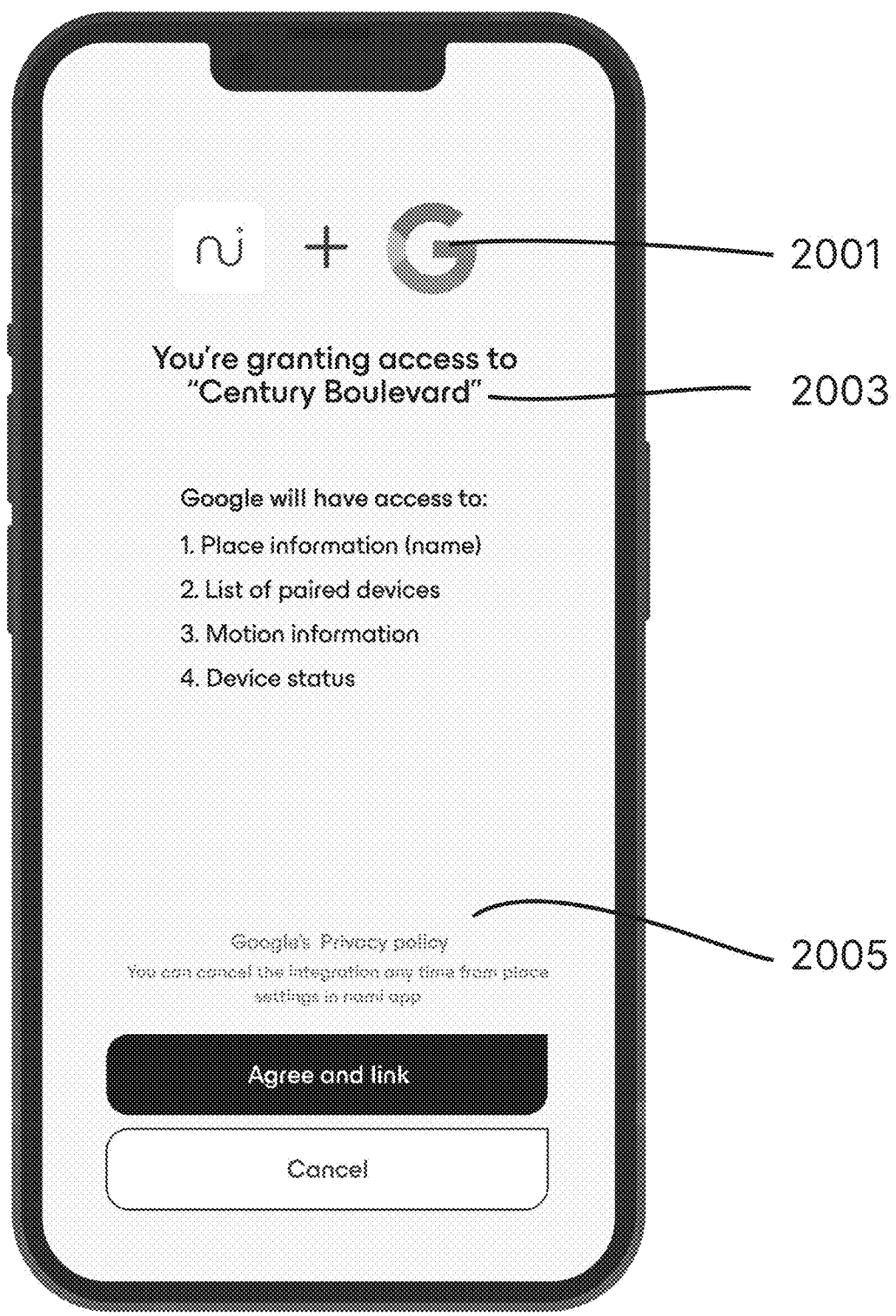
FIG. 20 shows an example of handover of the location to a third-party app once the location is set-up in the system.

At step S602, an installer/administrator pairs devices. The paring of devices comprises joining the devices to the network. The devices are placed in a first physical configuration. The physical configuration comprises the location, rotation, and/or Wi-Fi channel of the devices. More details about the different kind of installations of the sensing system may be found in FIG. 13. Once the sensing system is configured, a different user interface might be used by the end-user, depending on the context of the installation. A handover from the installer to a third-party interface may be required, as illustrated in FIG. 20.

Figure 18B:
FIGS. 18A-18B show an example of user interface dedicated to third-party installers, where the interface may be different depending on the context of the localisation to install (smart home or smart building).
Figure 18A:
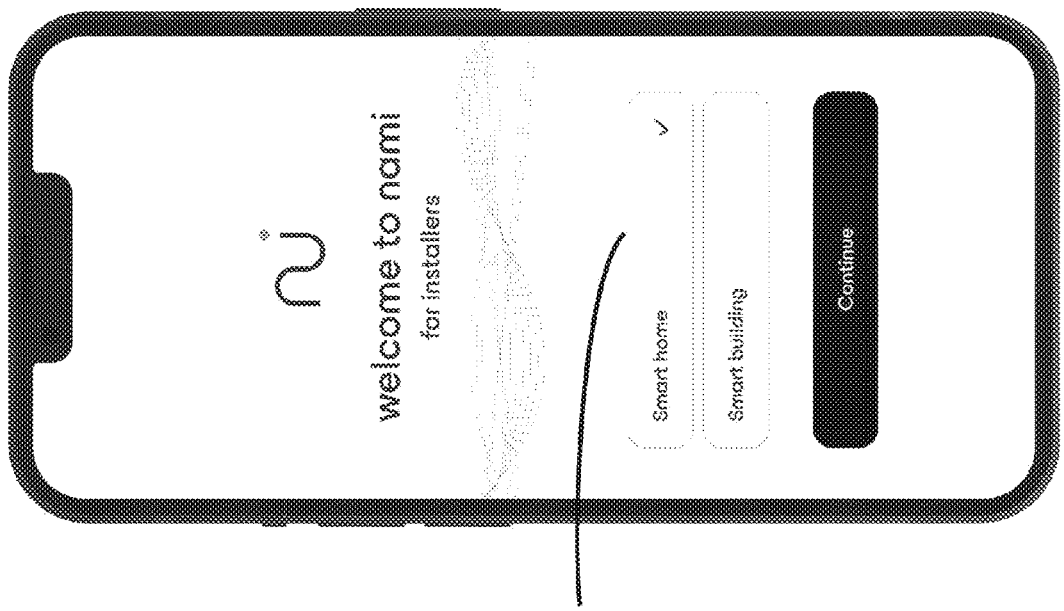
Figure 19:
FIG. 19 show an example of the user interface to manage location dedicated to third-party installers.

Depending on the context of the installation, the installer may use different user interfaces to configure the sensing system, as described in FIGS. 18A, 18B, 19.

Figure 13:
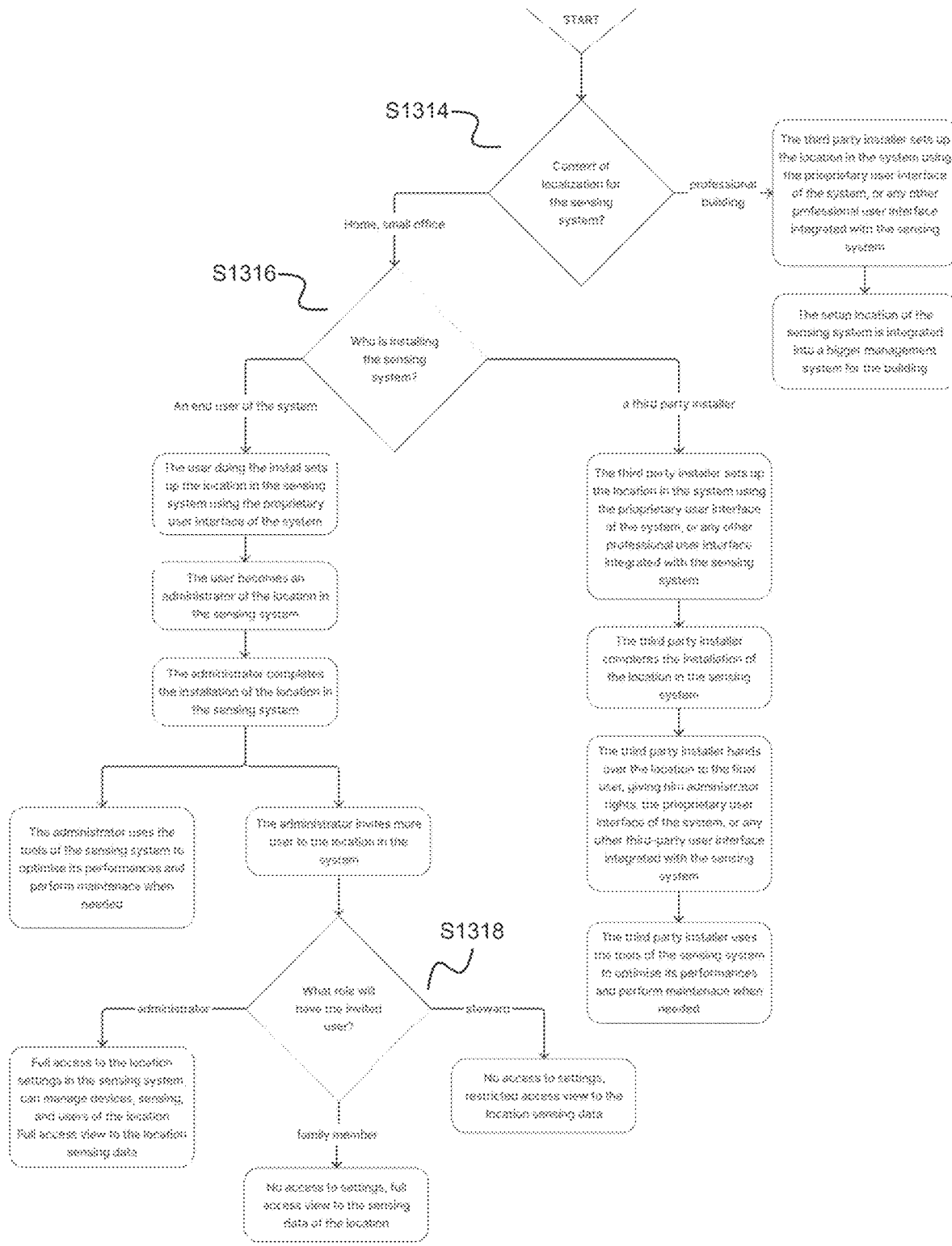
FIG. 13 shows an overview of the context of setting up a sensing system, including the location context, the kind of installer, and the different configurations of end-user access rights for the sensing system.
Figure 14:
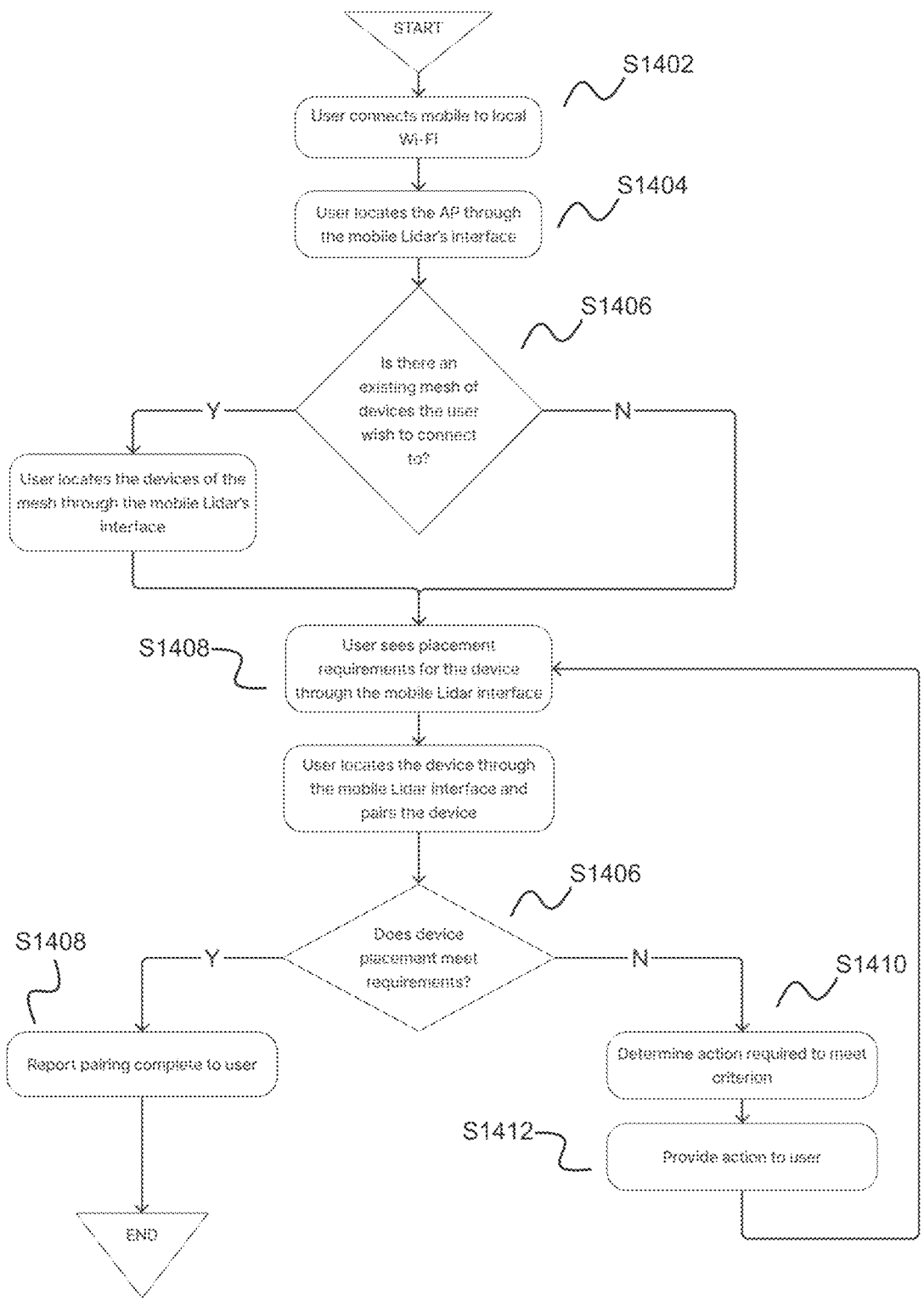
FIG. 14 shows an example of a detailed way of setting up the sensing system, including the checking of device placement, connectivity and overall sensing performances.

Reference is made herein to the user of the sensing system. They may be categorised into: "administrators" or "curators", who are able to alter the system; "family and close friends", who have access to data regarding the system but are not able to alter the system; and "stewards", who interact with the system in the sense that they are sensed by the system but have no access to any data generated by the system. The administrator role may be explained as in FIG. 13. Each user of the sensing system may have a defined role for each location, which may be described as in FIG. 13. In FIG. 13, step S1314 is a step of determining the localization context of the system, selected between professional and domestic. Other localisation contexts are possible—the system could be implemented in a variety of contexts, including offices, factories, warehouses etc. Step S1316 is step of determining who is installing the sensing system between an end user and a third-party installer. The installation flows may differ depending on the type of installer. Step S1318 is a step of determining what role a user has, between administrator, steward and family member. Other roles may be provided in the system. The user may be invited into the system as shown in FIG. 13. The descriptive text in the boxes of FIG. 13 is hereby incorporated into the present description as part of the description of the present disclosure. The order of the steps may be as illustrated in FIG. 13 or in any suitable order. Data defining the localisation context, installation context and/or role may be stored in suitable data structures in computer memory provided by the client or server device. The roles may be stored in association with an identifier of the person in that role.

A signal is received at a device from another device and the characteristics determined in step S604. The characteristics of this signal are sent to the characteristic processor 102 of the cloud computing environment 110, which determines whether the characteristic meets the configuration criterion stored in the configuration criterion database 104 at step S606.

If it is determined that the criterion is met, the devices in communication are in the preferred locations for sensing.

The characteristic processor 102 provides an indication of this finding to the feedback generator 106, which provides a positive report to the client device 1008 for displaying to the administrator via the user interface, indicating that the devices are positioned well, which corresponds to step S608.

If, however, the criterion is not met, the characteristic processor 102 determines an action required to meet the criterion at step S610. As described above, the configuration criterion database 104 may store possible actions for improving the system. The action is passed to the feedback generator 106, which provides a negative report to the client device 1008 for displaying to the administrator via the user interface, indicating that the devices are not positioned well and providing the suggested action, which corresponds to step S612. This action may also be referred to herein as a reconfiguration instruction.

In this case, the process returns to step S604, such that the signal characteristics continue to be determined and compared to the criterion until it is determined that the device is in a good location.

Alternatively, following the negative report provided to the administrator, step S604 may only be actioned once the administrator has moved the device and provided an indication via the user interface that the device has been moved. For example, the user may select an object on the interface which indicates that the device has been moved to a new location. After the user selection, the signal characteristics are again analysed to determine if the new location is suitable.

Figure 17:
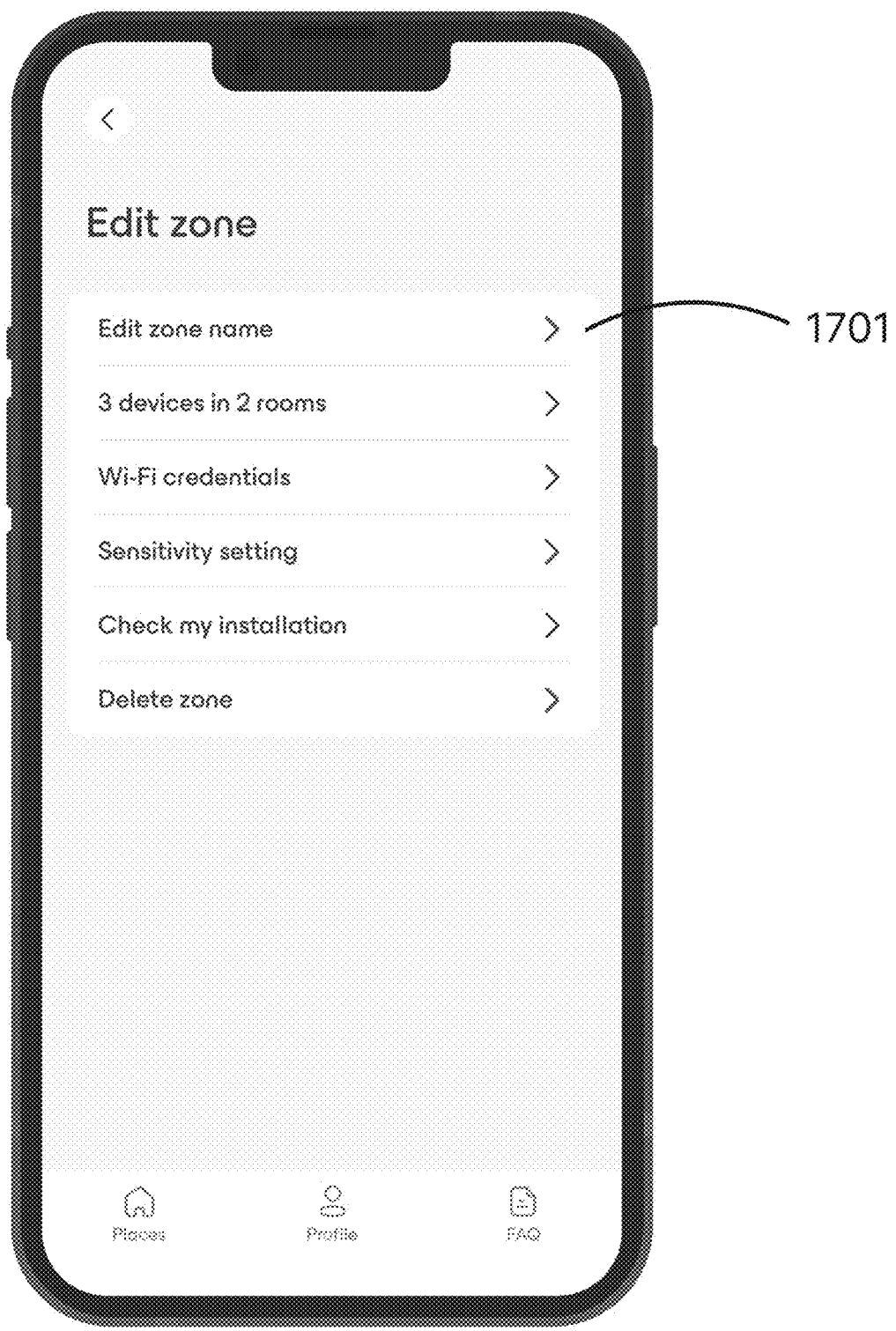
FIG. 17 shows an example of possible settings that an installer or and end-user may use to configure to the sensing system

The administrator is considered to have altered the physical configuration such that the devices are in a second physical configuration. The possible changes include moving one or more devices to a different location, rotating one or more devices, and changing the Wi-Fi channel. Further settings required to configure or update the sensing system may be seen in FIG. 17.

An example of the signal characteristic set out above is RSSI, with a criterion that the RSSI should be in the range of −70 to −75.

Another example signal characteristic is Wi-Fi round-trip-time (RTT). The Wi-Fi RTT can be used to calculate the distance between the devices by measuring the time taken for packets to travel from one device to another. The criterion in this instance may be a predefined time range or predefined distance range.

Another example signal characteristic is the signal-to-noise ratio (SNR) of the Wi-Fi environment. Wi-Fi channels may be congested. The criterion may be a threshold SNR above which the SNR must be in order to be acceptable. The action, in this case, to be implemented to improve the system is that of switching the Wi-Fi network to another channel. This will have the effect of improving not only the Wi-Fi sensing quality but also the overall Wi-Fi performance at home.

A further example of a signal characteristic is CSI. The CSI is used in conjunction with a user indication to compare detected presence or motion with actual presence or motion. In such an embodiment, the method of FIG. 6 is altered to include additional steps. At step S604, the CSI of the received signal is determined and compared to the CSI fingerprint or the CSI of a previous time window. Comparison to the CSI fingerprint can be used to detect presence, while the CSI of a previous, but recent, time window can be used to detect motion.

If it does not match, the sensing system detects presence or motion. The characteristic processor 102 provides an indication that there is a person present to the feedback generator 106, which generates a user interface at the client device 1008 requesting user feedback to indicate if there is in fact a person or pet present which has moved.

If the administrator provides an indication that there was real motion, the criterion is met, where the criterion is that there is motion where motion is detected by the signal.

If, however, the administrator provides an indication that there was no motion, the criterion is not met, and the administrator is provided with feedback to this effect (steps S610 and S612).

In some embodiments, there is a predefined level of motion required to be detected. The criteria may, in this instance, be both that the user has indicated motion and that the detected motion exceeds the predefined level. If the predefined level is not exceeded but some motion is detected, the position of the devices is not optimal as the response received from the system is quite weak and therefore some motion may go unnoticed.

Figure 7:
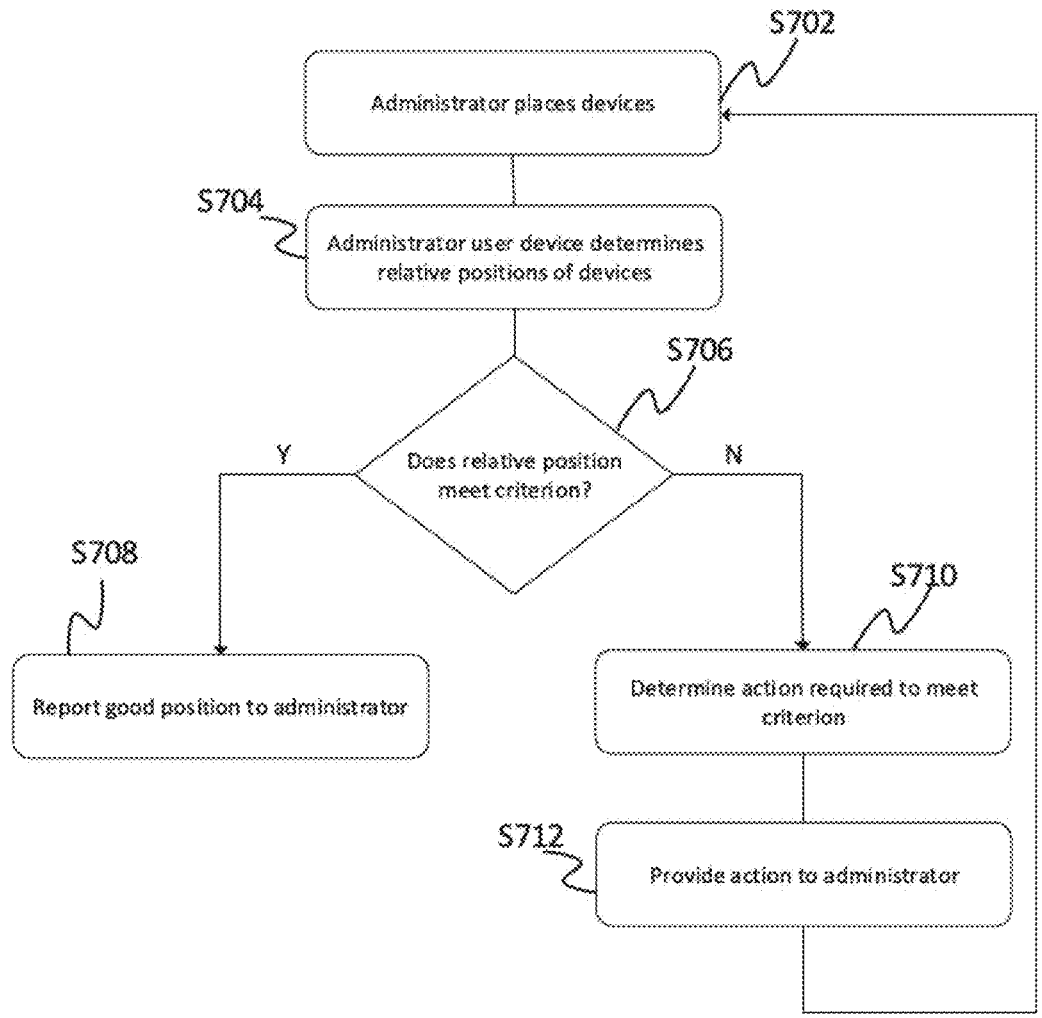
FIG. 7 is an example method for configuring the sensing system using an external user device.

As set out above, the client device may instead be used to determine if the position of the devices is optimal. FIG. 7 provides an example method for using the client device 1008 during optimisation.

At step S702, the administrator places the devices in the place in the first physical configuration. The devices need not be paired for this method.

At step S704, the administrator uses the client device 1008 to determine the relative locations of the devices. The relative locations are provided to the characteristics processor 102, which determines if the criterion is met, step S706. The criterion may be, for example, a predefined distance range between a pair of devices.

If it is determined that the criterion is met, the devices in communication are in the preferred locations for sensing. The characteristic processor 102 provides an indication of this finding to the feedback generator 106, which provides a positive report to the client device 1008 for displaying to the administrator via the user interface, indicating that the devices are positioned well, step S708.

If, however, the criterion is not met, the characteristic processor 102 determines an action required to meet the criterion at step S710. As described above, the configuration criterion database 104 may store possible actions for improving the system. The action is passed to the feedback generator 106, which provides a negative report to the client device 1008 for displaying to the administrator via the user interface, indicating that the devices are not positioned well and providing the suggested action, which corresponds to step S712.

In this case, the process returns to step S702, where the administrator moves at least one device such that the devices are in the second physical configuration and starts the process again.

The method of FIG. 7 is repeated until a positive report is provided to the administrator.

The client device 1008 may determine the relative locations of the devices in a number of ways. For example, phone sensors may be used to estimate the distance. In this embodiment, the administrator may be asked to go from one device to another one, carrying his mobile phone or other computer device 1008. Movement data is fetched from the pedometer and compass on the mobile device to calculate the approximate distance between the mesh devices. The pedometer and compass information of the client device 1008 may be derived from GPS data. In this embodiment, the characteristic processor 102 may be responsible for calculating the distance based on the fetched data. Alternatively, the client device 1008 may calculate the distance before sending to the characteristic processor 102.

In another embodiment, LIDAR and a camera of the client device 1008 are used to estimate the distance. The user is asked to do the following: take the camera, point at one of the mesh devices, walk with the camera turned onto another mesh device, point the camera at another device. LIDAR helps to measure the distance from one point to another. This may be illustrated in a more detailed way as in FIG. 15A.

It will be appreciated that any one or more of the above mentioned techniques may be used. If multiple methods are used, the criterion for each method are combined to define criteria that must be met. For example, both the SNR and RSSI of the received signal may be determined. In this case, the criteria defines both the RSSI range which is optimal and the threshold SNR. Only if both are met is the positive report provided to the administrator. This may be seen in a more detailed way as in FIG. 15B.

In some embodiments, the criterion depends on one or more of a sensing mode of the device and whether the devices in communication are in the same room of the place or different rooms. Sensing modes are use cases for the sensing system mesh devices or nodes. For example, some nodes may be in a security sensing mode, intended to determine if there is an unauthorised entry into any part of the place. Other nodes may be in an automation sensing mode, which is used to determine automation events such as turning on lights based on the presence of a person.

The signal characteristics and determined relative device locations described with reference to FIGS. 6 and 7 are herein referred to collectively as characteristics of the physical configuration. This is because both the signal characteristics and the distance between the devices depend on the relative locations of the devices.

FIGS. 12A-M show example user interfaces displayed on the display of the user device during system configuration. The user interface may be provided via an application installed on the client device or via a web browser. The user first selects user selectable element 1204 shown in FIG. 12A to proceed to the next step. The user is then presented with another selectable element, shown in FIG. 12B. The user selects user selectable element 1205 to start the configuration process.

The user is then requested to provide an identifier of the network device. In the example of FIG. 12C, the user is requested to scan a QR code on the device. Other identifiers may be provided such as a unique identifier code or barcode. The QR code is shown to the user on the user interface as it is captured by a camera of the user device.

Figure 12F:
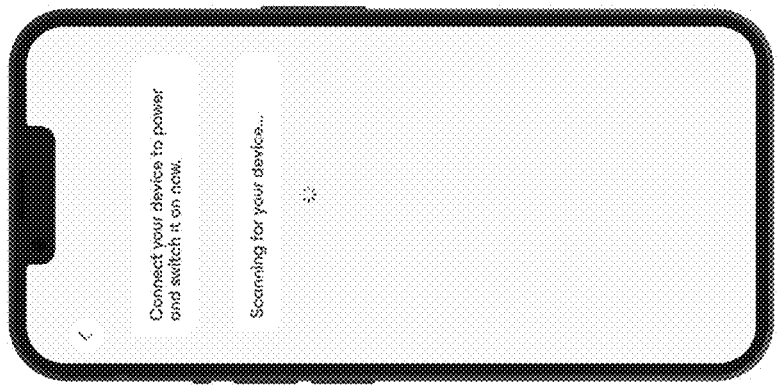
Figure 12E:
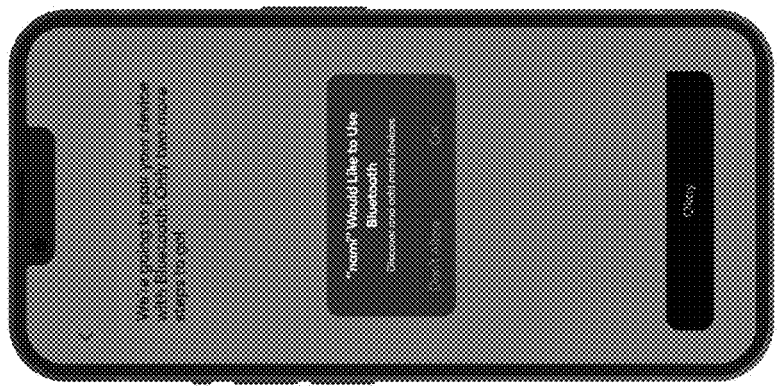
Figure 12D:
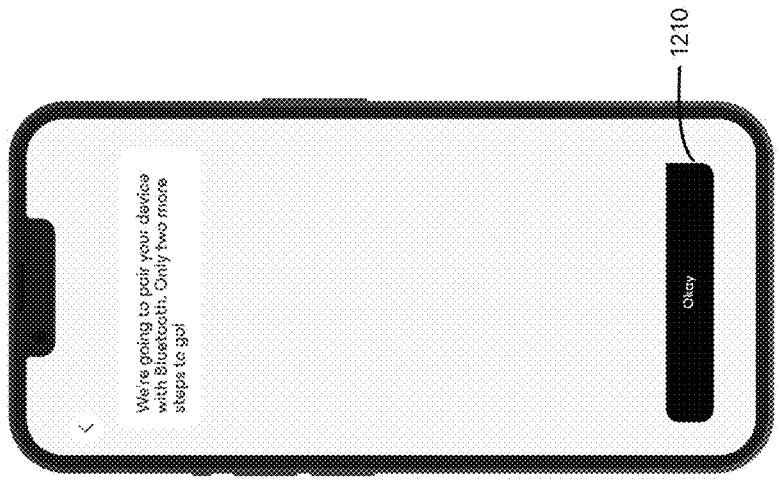

The user is then provided with a message indicating that Bluetooth will be used to pair the device, FIG. 12D. The user agrees by selecting user selectable element 1210. The user device may require additional permission from the user for allowing the application to use Bluetooth, as shown in FIG. 12E.

Once the device is connected to Bluetooth, the user is requested to turn the device on, FIG. 12F.

Figure 12I:
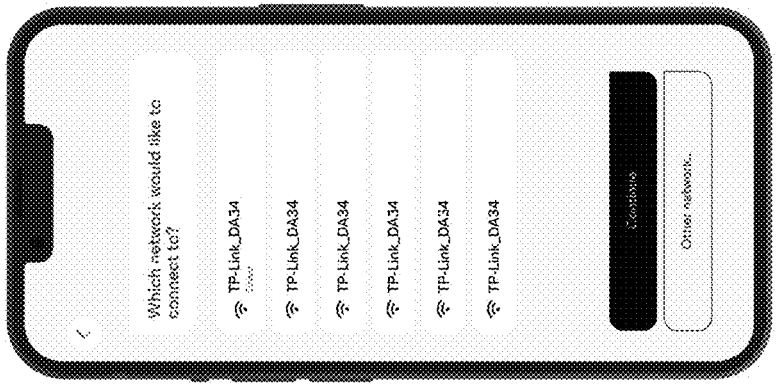
Figure 12H:
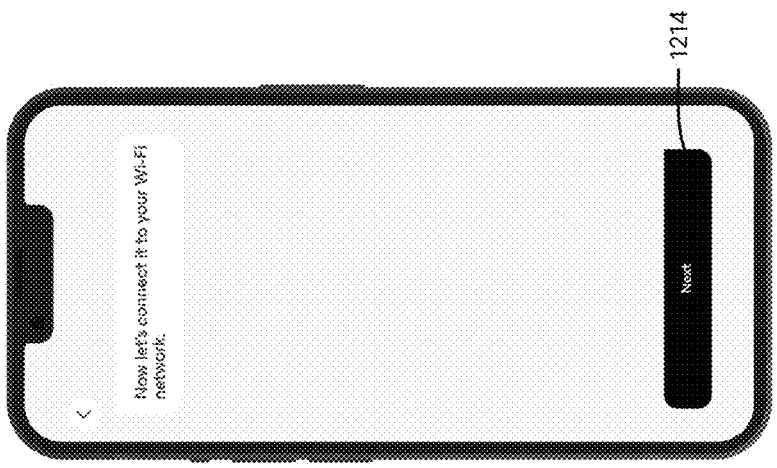
Figure 12G:
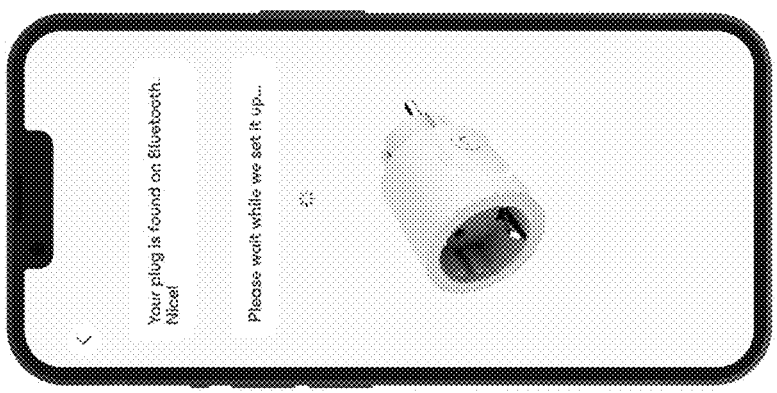
Figure 12M:
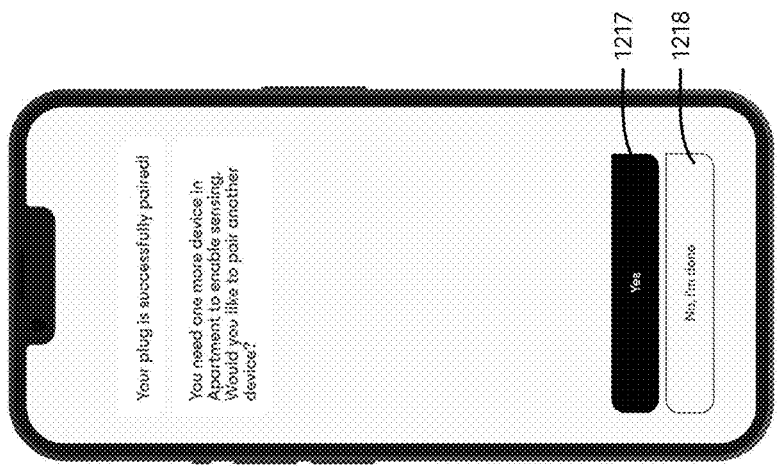

If the system detects the device connected to Bluetooth, the user is provided with a detection confirmation message, FIG. 12G. The user is then requested to allow the device to connect to Wi-Fi, FIG. 12H, by selecting element 1214.

The user is provided with the detected networks, shown in FIG. 12I. The user selects which of the Wi-Fi networks the device is to join by selecting the network from the list and confirming their selection using element 1216, as shown in FIG. 12J. The user is then requested to enter their Wi-Fi password, FIG. 12K, and shown a progress view while the device is set up, FIG. 12L. Once device set up is complete, a setup completion message is provided to the user, FIG. 12M.

Figure 8A:
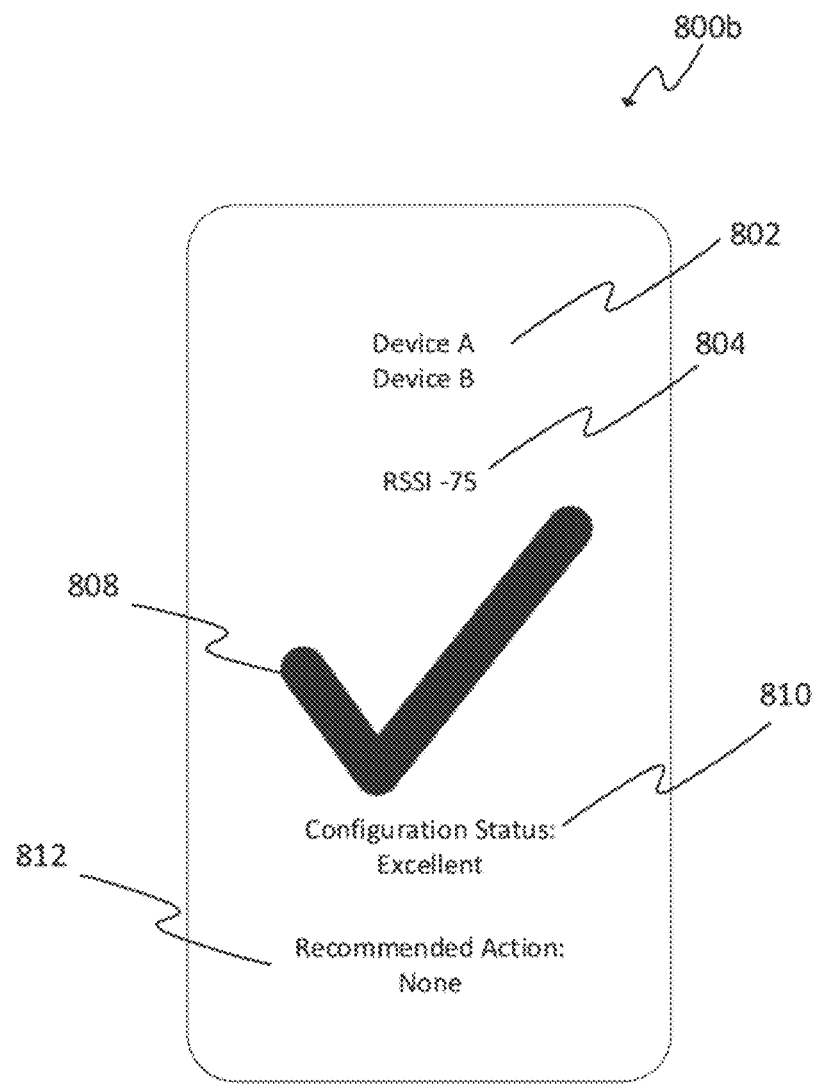
FIGS. 8A-8B show an example user interface for configuring the sensing system.
Figure 8B:
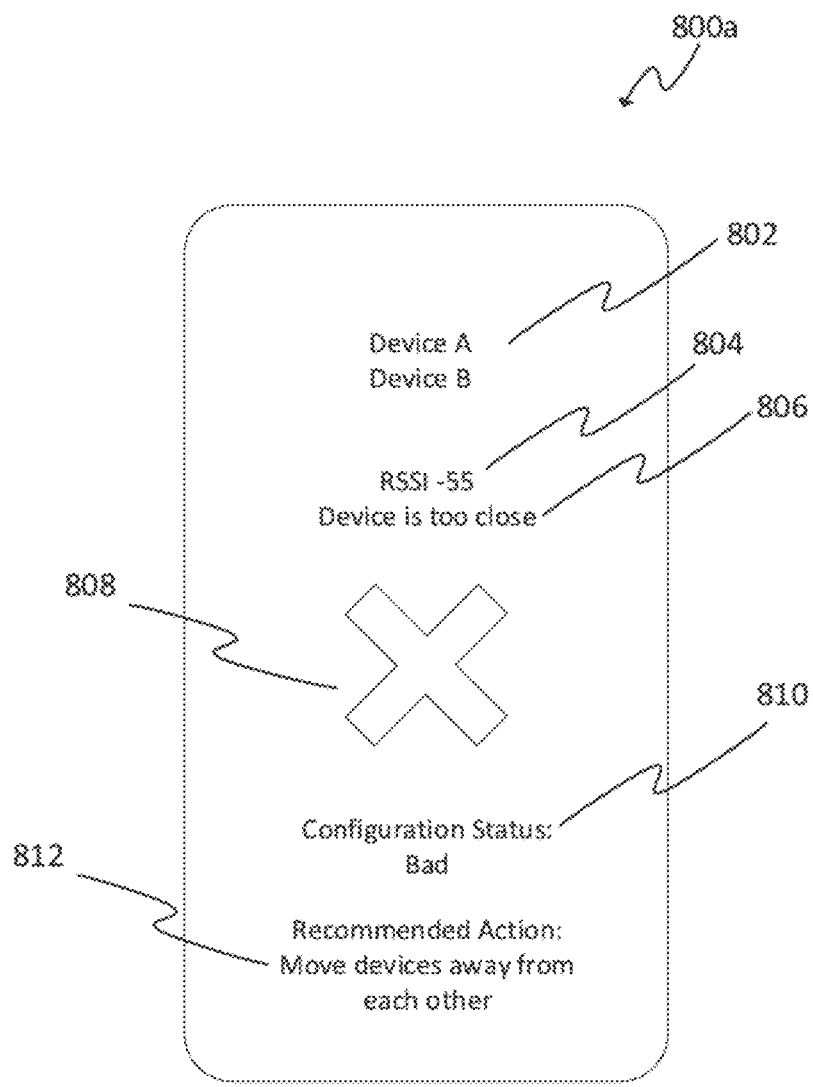

FIGS. 8A and 8B show negative and positive user interfaces 800a, 800b respectively. On each display, there is a device indicator 802, indicating the devices which are optimised, a configuration status indicator 810, a recommended action 812, and a graphic indicator 808.

In the embodiment of FIGS. 8A and 8B, the signal characteristic is the RSSI. There is also provided a signal characteristic indicator 804, which provides the user with the RSSI.

The negative user interface 800a also provides the user with a problem indicator 806, which informs the user of the reason the positioning of the devices is not optimal.

The negative user interface 800a is provided to the user if is it determined that the configuration criterion is not met. In this example, devices A and B, as indicated in the device indicator 802, are being considered. The RSSI has been found to be −55, as indicated by the signal characteristic indicator 804, such that the devices are too close, provided by the problem indicator 806. The graphic indicator 808 is a cross and may be shown in red, for example. The configuration status indicator 810 states that the status is "bad", corresponding to the fact that the criterion has not been met, and the recommended action 812 is to "move the devices away from each other".

Once the configuration criterion has been met, the positive user interface 800b is provided to the administrator via the client device 1008.

Again, devices A and B are considered as indicated in the device indicator 802. Now, the RSSI has been found to be −75, as indicated by the signal characteristic indicator 804. The graphic indicator 808 is a tick and may be shown in green, for example. The configuration status indicator 810 states that the status is "excellent", corresponding to the fact that the criterion has been met, and the recommended action 812 is "none".

The ideas explained above may also be illustrated by FIGS. 15A, 15B.

Figure 9:
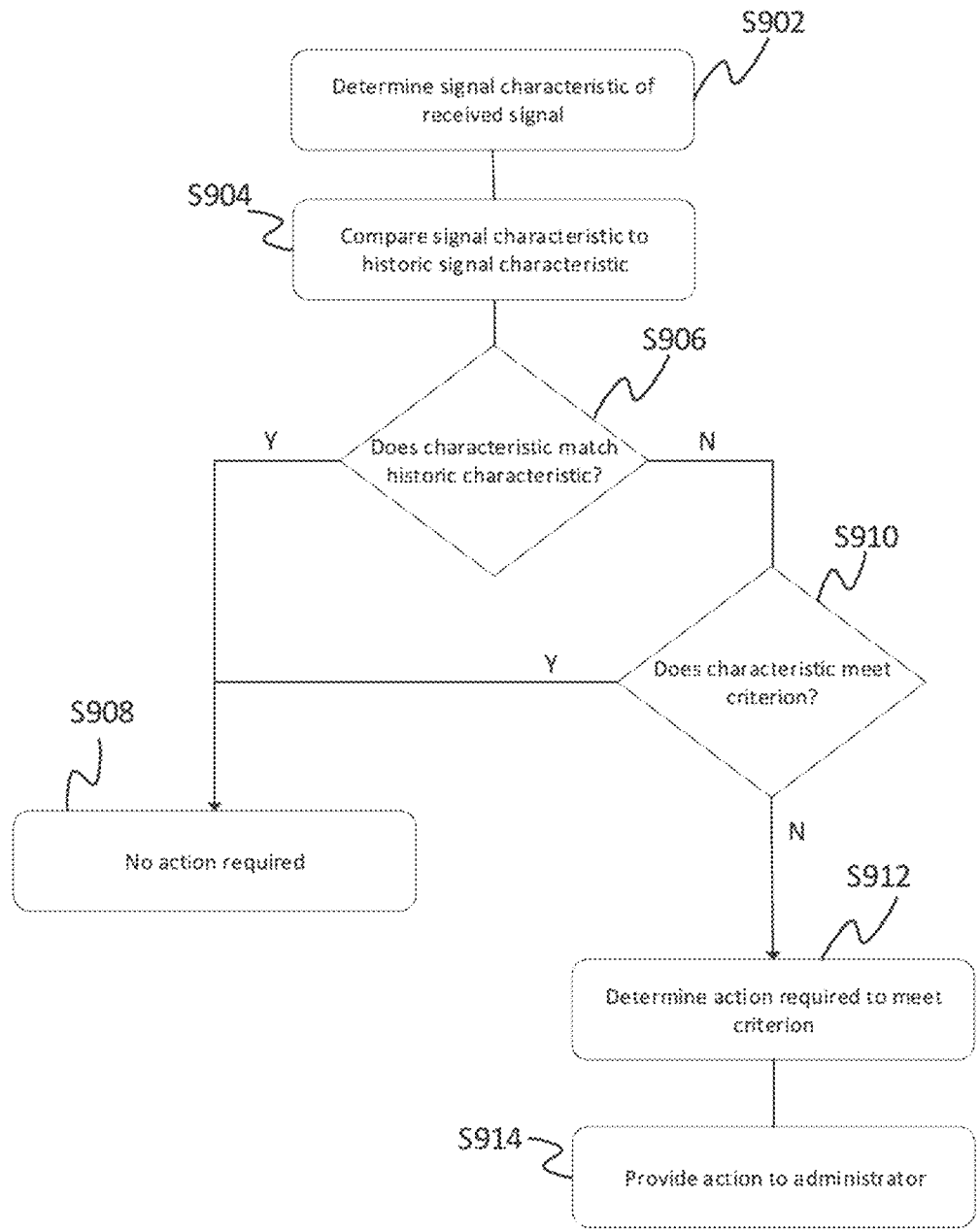
FIG. 9 is an example method of re-configuring the sensing system.

It will be appreciated that the user interfaces 800a, 800b may provide one or more of the above-mentioned indicators to provide the administrator with feedback pertaining to the current configuration of the devices. Once the devices have been positioned, the sensing network 112 is continuously or periodically monitored to identify faults or changes. FIG. 9 provides an example method for monitoring the sensing network 112.

At step S902, a signal characteristic of a signal received at a mesh device is determined. This is compared to the signal characteristic of a historic signal by the characteristic processor 102 at step S904. The historic signal may be a signal received at the device during configuration once it is determined that the configuration criterion has been met. The signal characteristic of the historic signal may be stored in the configuration criterion database 104 or some other database accessible to the characteristic processor 102.

At step S906, it is determined, by the characteristic processor 102, if the characteristic matches the historic characteristic. If it does, there has been no change in the system and therefore no action is required, step S908. In some embodiments, the administrator may be informed that the system configuration is good via a user interface at the client device 1008.

If, however, the characteristic and historic characteristic do not match, there has been some change in the system. It may be that one or more of the devices have been moved or rotated. Alternatively, there may have been a change in the physical environment, such as the introduction of a new piece of furniture.

The characteristic of the received signal is compared to the configuration criterion. Step S910. If the criterion is still met, the configuration is considered optimal even though there has been a change and therefore no action is required, step S908.

However, in some instances the criterion is no longer met following the change. The characteristic processor 102 determines the action required to meet the criterion, step S912, and provides this to the feedback generator 106 for providing to the administrator via the user interface, step S914.

The administer can then use the method of FIG. 6 or 7 to re-configure the system to meet the configuration criterion.

The method of FIG. 9 may be initiated in response to a request received from the administrator via the user interface. Alternatively, the method may be initiated periodically or after a predefined period of time from initial setup. For example, the monitoring method of FIG. 9 may be initiated 1 week after initial setup.

A change in the configuration which causes the characteristic to no longer meet the configuration criterion is referred to as a degradation of the system. This is because the configuration is no longer optimised.

In some embodiments, the method of FIG. 9 is initiated as new people join a place, including family and close friends and stewards. This allows the system to learn and understand the patterns of movement, i.e., gait, of each user of the system. Fingerprints for users are determined and stored in a similar way to those for unoccupied rooms, as discussed with reference to FIG. 4A.

Figure 10:
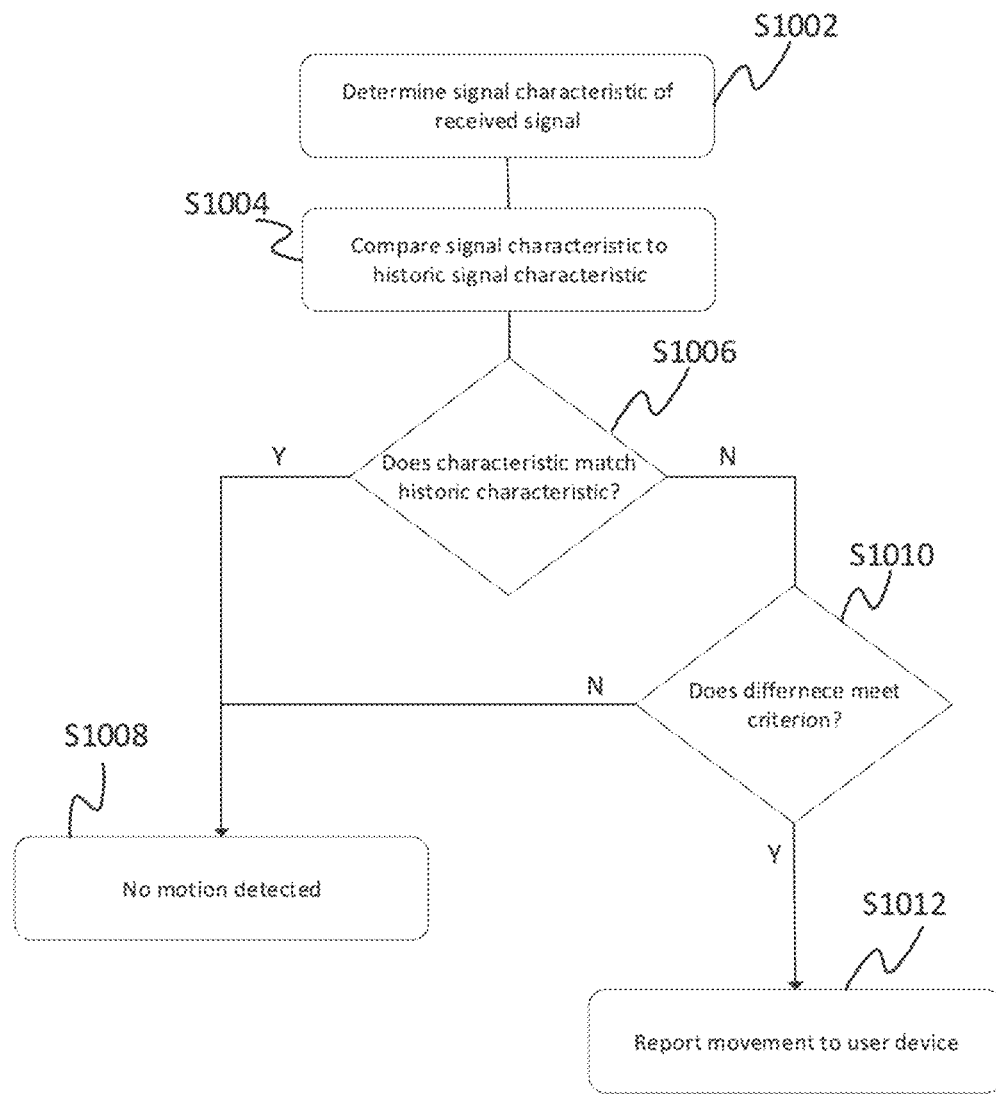
FIG. 10 is an example method of using the configured sensing system in a game environment.

The method and system described herein can be used for gamification of setting up/monitoring the sensing network 112. FIG. 10 shows an example game method which can be implemented using the disclosed Wi-Fi sensing system. In the below example, the signal characteristic is CSI. One well known game is one in which one person stands with their back to a group of other people, who have to approach the standing person without being seen to be moving. The standing person can turn round at any point, at which point, the moving players have to 'freeze'. In this game, the system may be configured to correctly monitor the motion of the moving players, when they are moving, and not detect motion when they are still.

At step S1002, the signal characteristics of a signal received at a receiver device from another of the devices in the sensing network 112, acting as a beacon, are determined. The CSI is then compared to the CSI from a previous time period or window, step S1004, and it is determined at step S1006 if the current and previous CSI match.

If the current and previous CSI match, there is no motion detected, step S1008.

If, instead, the current and previous CSI do not match, there is some motion. It is then determined if the difference meets a motion criterion at step S1010. The motion criterion defines a level of motion which is deemed sufficient for a player to be deemed moving. The motion criterion may be selected to change the difficulty of the game. For example, a higher level of motion defined in the motion criterion makes the game easier. The players may select the difficulty level at the start of the game, thereby selecting the motion criterion to be used.

Figure 16B:
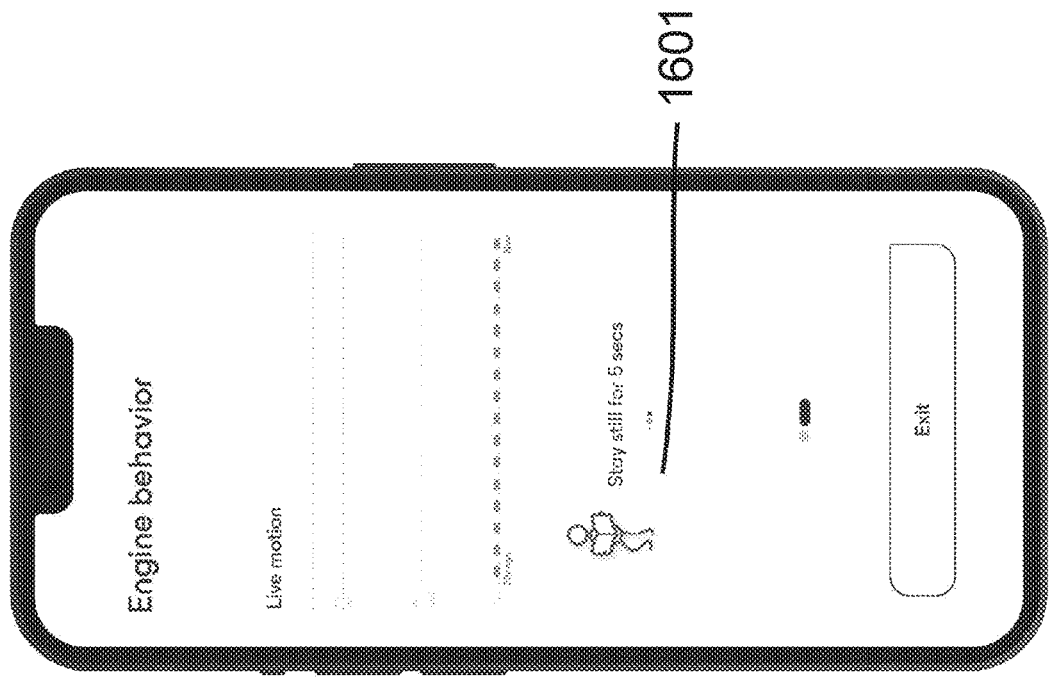
FIGS. 16A-16B show a possible action required from the installer or end-user to validate the sensing system capabilities.
Figure 16A:
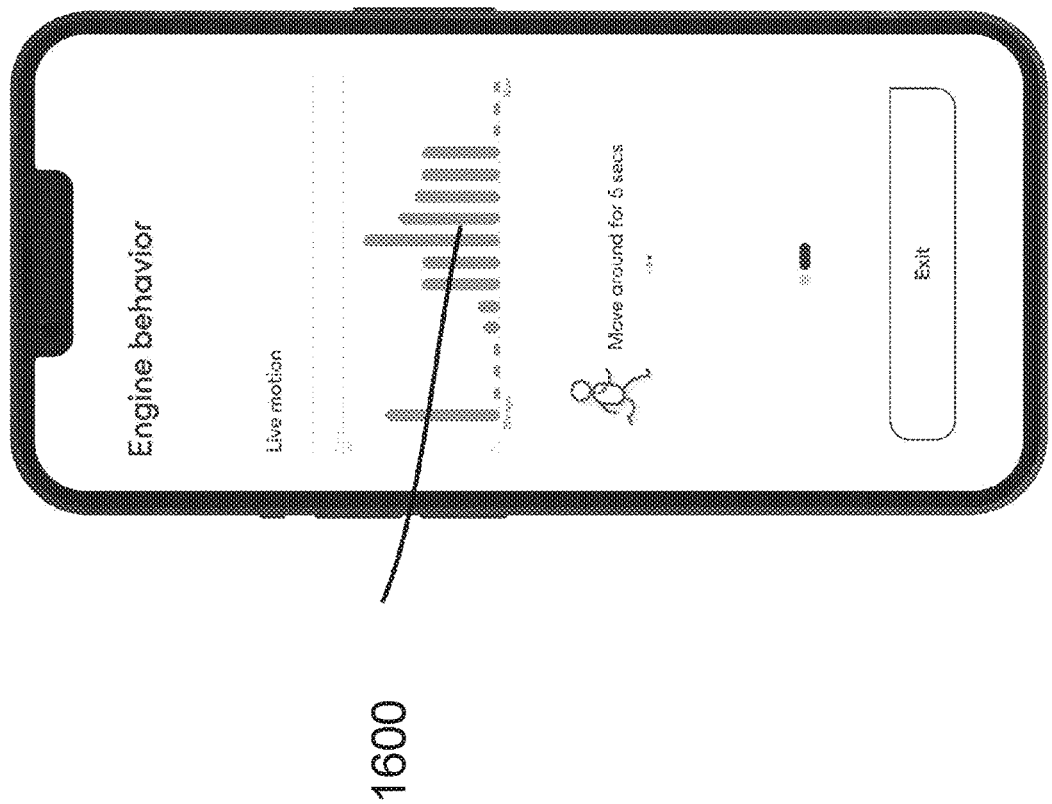

If the difference does not meet the motion criterion, the player is deemed not to be moving and therefore no action is required, step S1008. This validation process may be illustrated in more details as in FIGS. 16A, 16B.

However, if the difference does meet the motion criterion, the player is deemed to be moving and a report is provided to the client device 1008 to inform the players.

Another game which could be implemented using the sensing system requires players to cross a zone as stealthily as possible from a point (device) A to a point (device) B, and back from B to A, defined by a referee (who may be an administrator/curator of the system), and then from a point C to a point D (usually only crossing orthogonally a tripwire generated between device A and device B). Different players sequentially cross the same zone, with the aim of making the smallest possible movements to generate the smallest waves. The winner would be the one which has been the "stealthiest ninja", i.e., moving between the points in such a way as to generate the smallest wave echoes overall. This game could be used to adjust the sensitivity of the devices in the given zone, e.g., by adjusting a minimum difference between CSI windows to cause the system to register movement. The adjunction of LIDAR could help to define the overall size/volume of a person at the beginning of the game and adjust some coefficient relating to the user for sensing the user (both for game scoring and updating/improving the sensing system).

The administrator may then monitor activities and aids in the configuration of the system. For example, assisted machine learning and/or supervised fine-tuning can be used to improve the sensitivity of the system.

Although the above disclosure relates to the detection of a person, the methods and system disclosed herein may be used to detect any foreign entity, including animals, and moving inanimate objects.

The place used in the examples presented above is a house. The place may be any environment for which wireless signals may be used to sense entities. Such environments include an indoor environment such as a house, office, or hospital, or an outdoor environment, including open-air environments with barriers (manmade or natural), enclosed environments, and underground environments.

In some embodiments, the place is divided into "zones". The mesh devices within each zone may be configured in sensing modes dependent on the zone. Within a building, zones may be a single room or a group of rooms and may be on a single floor or spread over multiple floors.

Devices that are part of the same zone may be able to act as beacons and/or listen to other Wi-Fi sensing devices in that zone. If a device in a particular zone is unable to communicate effectively with other devices in that zone, an application running on the client device 1008 may suggest that a separate zone be created. It will be appreciated that such suggestions may only be made to a curator user.

In some embodiments, the administrator may be provided with an evaluations score pertaining to the configuration and re-configuration of the sensing system. The evaluation score may be for the whole place, or one or more zones/rooms of the place. The evaluation score may further be defined for each sensing mode.

In some embodiments, the system provides feedback to one or more groups of users based on a determined severity. For example, if it is determined in the method of FIG. 9 that the change is such that the degradation of the system is minor, the alert is provided only to the administrator(s). However, if the change is such that the degradation of the system is major, all users, including stewards, may be alerted.

A determined location of one or more of the users may also determine whether or not the user receives the alert. For example, if it is determined that there is a user at the place at which there is a degradation of the system, that user, rather than any other, may be alerted.

Signal characteristic extraction and evaluation can be implemented in a variety of ways. For example, artificial intelligence models can be used to extract signal characteristics from received signals and/or analyse the signal characteristics to determine if it indicates the presence of a person or meets a criterion. In another embodiment, an algorithm is run which accesses a memory storing the predefined criterion and compares the signal characteristics of the received signal with the criterion. Other processing techniques known in the art may additionally or alternatively be used, such as time and/or frequency domain processing, smoothing, de-noising, filtering, quantization, thresholding, and transforming.

The example system described herein uses Wi-Fi signals to sense an entity which is not a constant in the place. However, it will be appreciated that other wireless signals may be used in the same system to achieve the effect of flexible sensing for a variety of sensing modes, while maintaining an order of privacy.

In the embodiments set out above, the characteristic of the physical environment is compared to a criterion. In other embodiments, other methods may be used to determine if the configuration is optimal. For example, a machine learning model may be trained to classify characteristics and thereby determine if the configuration should be altered. Similarly, a machine learning model may be used to determine a suggested action for the user to implement in order to improve the configuration.

Figure 11:
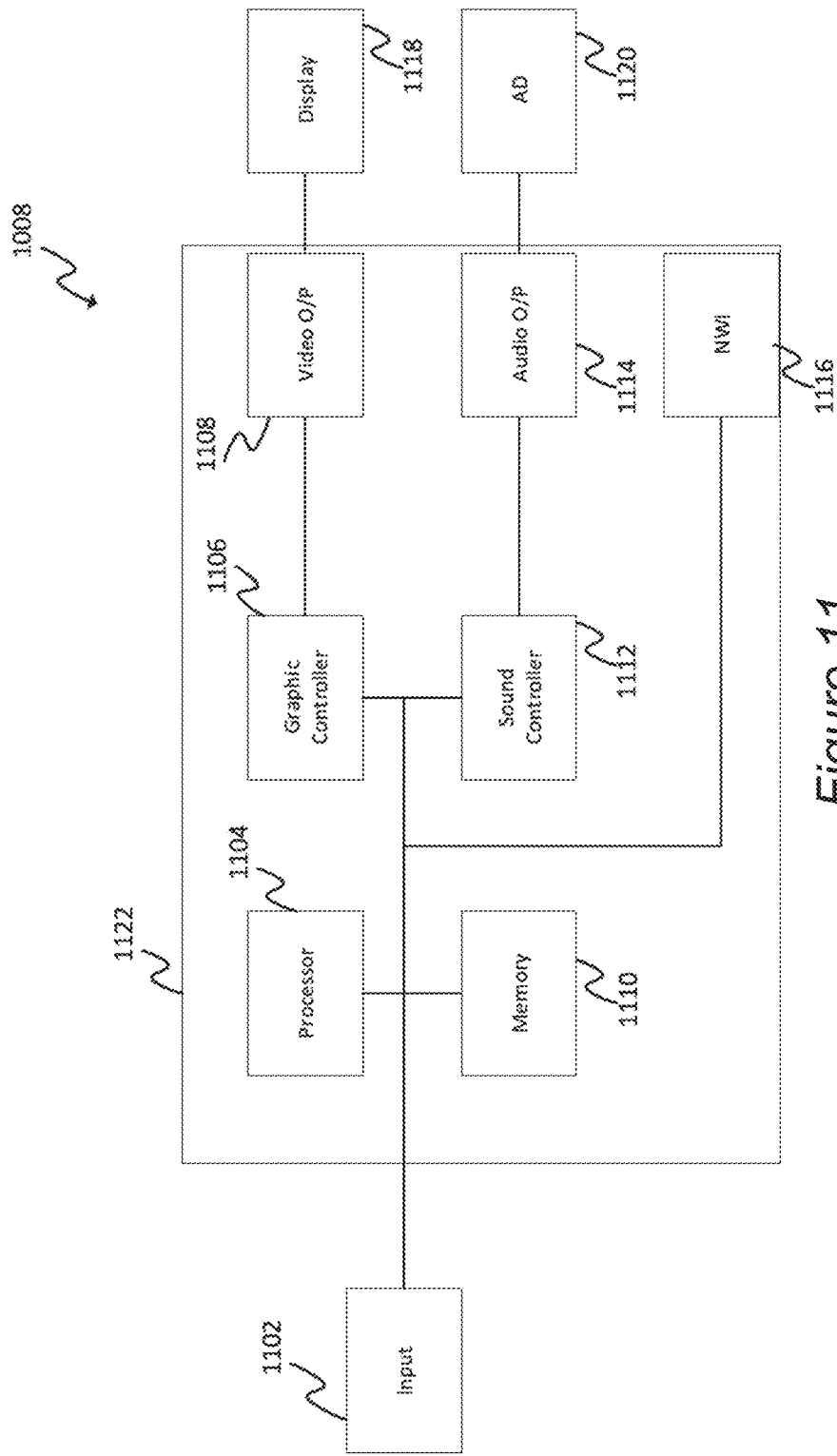
FIG. 11 is a schematic diagram of a client device in which aspects of the sensing system may be implemented.

A schematic view of the client device 1008 according to an embodiment is shown in FIG. 11. The user device 1008 has a controller 1122. The controller 1122 may have one or more processors 1104 and one or more memories 1110. For example, a computer code of executing the configuration method or monitoring method on the user device 1008 may be stored in the memory 1110. The configuration criterion database 104 may also be stored at the memory 1110. The memory 1110 may also store the application which provides the user with capabilities for selecting devices, responding to feedback, and receiving sensing information and alerts, the application being implemented by the processor 1104.

The controller 1122 is also shown as having a graphics controller 1106 and a sound controller 1112. It should be appreciated that one or other or both of the graphics controller 1106 and sound controller 1112 may be provided by the one or more processors 1104. Other functional blocks may also be implemented by suitable circuitry or computer code executed by the one or more processors 1104.

The graphics controller 1106 is configured to provide a video output 1108. The sound controller 1112 is configured to provide an audio output 1114. The controller 1122 has a network interface 1116 allowing the device to be able to communicate with a network such as the Internet or other communication infrastructure.

The video output 1108 may be provided to a display 1118. The audio output 1114 may be provided to an audio device 1120 such as a speaker and/or earphones(s).

The device 1008 may have an input device 1102. The input device 1102 can take any suitable format such as one or more of a keyboard, mouse, or touch screen. It should be appreciated that the display 1118 may in some embodiments also provide the input device 1102, for example, by way of an integrated touch screen.

The blocks of the controller 1122 are configured to communicate with each other via an interconnect such as a bus or any other suitable interconnect and/or by point-to-point communication.

It should be appreciated that, in some embodiments, the controller 1122 may be implemented by one or more circuits, at least in part.

It should be appreciated that embodiments may be deployed in different system architectures. For example, the characteristic processor 102 and feedback generator 106 may be implemented as a computer program that is stored in the memory 1110 of the user device 1008. In another system architecture, the characteristic processor 102, configuration criterion database 104, and feedback generator 106 are stored at the server 1002 and implemented by a processor do the server 1002. Configuration information is then provided by the network 1004 to the user device 1008 for providing to the user via the user interface.

The reference numerals and text in FIGS. 12 to 20 are incorporated into this description of the disclosure by this reference.

It will be appreciated that the above embodiments have been described only by way of example. Other variations and applications of the present invention will be apparent to the person skilled in the art in view of the teaching presented herein. The present invention is not limited by the described embodiments, but only by the accompanying claims.

The invention claimed is:

1. A computer-implemented method of configuring a sensing system for monitoring a place, the sensing system comprising a plurality of network devices located in the place and including at least one network device configured as a transmitter to transmit wireless signals over one or more wireless channel and at least one network device configured as a receiver to receive wireless signals transmitted in the place and subject to disturbance by the place, the method comprising:

transmitting wireless signals from the transmitter;

detecting disturbed wireless signals at the receiver;

determining from the disturbed wireless signals a characteristic of a first physical configuration of the network devices, wherein the characteristic of the first physical configuration is a signal characteristic of a first received signal, wherein the signal characteristic comprises channel state information;

determining if the characteristic of the first physical configuration meets a configuration criterion;

providing to a user, via a user interface of a client device associated with the user, feedback based on the characteristic of the first physical configuration, wherein the feedback is provided based on whether the characteristic of the first physical configuration meets the configuration criterion, wherein the configuration criterion defines that the channel state information of the received signal matches channel state information of a characteristic signal representative of the place, wherein the feedback provided to the user comprises a request for the user to confirm movement of an entity in a path of the first received signal and, upon receiving a confirmation of the movement from the user via the user interface, at least one of an indication of a quality of the first signal and a reconfiguration instruction;

detecting that a second physical configuration has been implemented in response to the feedback; and determining a characteristic of a second physical configuration, wherein the characteristic of the second physical configuration is a signal characteristic of a second received signal, and wherein the first and second received signals are received by the receiver.

2. The computer-implemented method of claim 1, wherein the wireless signals comprise one or more of WiFi signals, signals used in telecommunication environments including wide band code division multiple access (WCDMA), long term evolution (LTE) and telecommunication signals according to the third generation (3G), fourth generation (4G) and fifth generation protocols (5G), and Bluetooth.

3. The computer-implemented method of claim 1, wherein the method further comprises determining if the characteristic of the first physical configuration meets a configuration criterion, wherein the feedback is provided based on whether the characteristic of the first physical configuration meets the criterion.

4. The computer-implemented method of claim 3, wherein the method further comprises determining a reconfiguration instruction for changing from the first physical configuration to the second physical configuration, the reconfiguration instruction being based on a physical change required for meeting the configuration criterion.

5. The computer-implemented method of claim 4, wherein the feedback is the reconfiguration instruction.

6. The computer-implemented method of claim 1, wherein the method further comprises providing to the user, via a user interface, feedback based on the characteristic of the second physical configuration.

7. The computer-implemented method of claim 1, wherein the feedback comprises an indication of the signal characteristic of the first received signal.

8. The computer-implemented method of claim 1, wherein the method further comprises determining a second characteristic of the first received signal, wherein the feedback is based on the second characteristic.

9. The computer-implemented method of claim 1, wherein the feedback is provided based on whether the characteristic of the first physical configuration meets the criterion, wherein configuration criterion comprises the signal characteristic of the first received signal being substantially similar to the signal characteristic of a past signal received at the receiver.

10. The computer-implemented method of claim 1, wherein the method further comprises determining a second characteristic of the first and second physical configurations based on data collected by the client device.

11. The computer-implemented method of claim 10, wherein the data collected by the client device comprises (i) at least one of location and movement data corresponding to a location of the transmitter and the receiver, wherein the method further comprises determining a distance between the transmitter and the receiver based on the collected data, and/or (ii) LiDAR data, wherein the method further comprises determining a distance between the transmitter and the receiver based on the LiDAR data.

12. The computer-implemented method of claim 1, wherein the first physical configuration comprises the transmitter and the receiver in a first relative position, and the second physical configuration comprises the transmitter and the receiver in a second relative position.

13. The computer-implemented method of claim 1, wherein the first physical configuration comprises a first transmitter-receiver pair comprising the transmitter and the receiver, and the second physical configuration comprises a second transmitter-receiver pair, wherein one of the transmitter and the receiver is the same in the first and second pairs and the other of the transmitter, and the receiver is different in the first and second pairs.

14. The computer-implemented method of claim 1, wherein the first physical configuration comprises the transmitter and receiver communicating over a first network channel, and the second physical configuration comprises the transmitter and receiver communicating over a second network channel.

15. A computing device for configuring a sensing system for monitoring a place, the sensing system comprising a plurality of network devices located in the place and including at least one network device configured as a transmitter to transmit wireless signals over one or more wireless channel and at least one network device configured as a receiver to receive wireless signals transmitted in the place and subject to disturbance by the place, the computing device comprising:
at least one processor; and
a memory storing instructions, which, when implemented on the at least one processor, cause the at least one processor to:
determine, from disturbed wireless signals received at the receiver, a characteristic of a first physical configuration of the network devices, wherein the characteristic of the first physical configuration is a signal characteristic of a first received signal, wherein the signal characteristic comprises channel state information;
determine if the characteristic of the first physical configuration meets a configuration criterion;
provide to a user, via a user interface of a client device associated with the user, feedback based on the characteristic of the first physical configuration, wherein the feedback is provided based on whether the characteristic of the first physical configuration meets the configuration criterion, wherein the configuration criterion defines that the channel state information of the received signal matches channel state information of a characteristic signal representative of the place, wherein the feedback provided to the user comprises a request for the user to confirm movement of an entity in a path of the first received signal and, upon receiving a confirmation of the movement from the user via the user interface, at least one of an indication of a quality of the first signal and a reconfiguration instruction;
detect that a second physical configuration has been implemented in response to the feedback and
determine a characteristic of a second physical configuration, wherein the characteristic of the second physical configuration is a signal characteristic of a second received signal, and wherein the first and second received signals are received by the receiver.

16. A sensing system for monitoring a place, the sensing system comprising:
a plurality of mesh devices located in the place and including at least one mesh device configured as a receiver and at least one mesh device configured as a transmitter; and
a computing device for configuring a sensing system for monitoring a place, the sensing system comprising a plurality of network devices located in the place and including at least one network device configured as a transmitter to transmit wireless signals over one or more wireless channel and at least one network device configured as a receiver to receive wireless signals transmitted in the place and subject to disturbance by the place, the computing device comprising:
at least one processor; and a memory storing instructions, which, when implemented on the at least one processor, cause the at least one processor to:

determine, from disturbed wireless signals received at the receiver, a characteristic of a first physical configuration of the network devices, wherein the characteristic of the first physical configuration is a signal characteristic of a first received signal, wherein the signal characteristic comprises channel state information;

determine if the characteristic of the first physical configuration meets a configuration criterion;

provide to a user, via a user interface of a client device associated with the user, feedback based on the characteristic of the first physical configuration, wherein the feedback is provided based on whether the characteristic of the first physical configuration meets the configuration criterion, wherein the configuration criterion defines that the channel state information of the received signal matches channel state information of a characteristic signal representative of the place, wherein the feedback provided to the user comprises a request for the user to confirm movement of an entity in a path of the first received signal and, upon receiving a confirmation of the movement from the user via the user interface, at least one of an indication of a quality of the first signal and a reconfiguration instruction;

detect that a second physical configuration has been implemented in response to the feedback; and determine a characteristic of a second physical configuration, wherein the characteristic of the second physical configuration is a signal characteristic of a second received signal, and wherein the first and second received signals are received by the receiver.

* * * * *